United States Patent
Levy et al.

(10) Patent No.: US 10,735,769 B2
(45) Date of Patent: Aug. 4, 2020

(54) LOCAL MOTION COMPENSATED TEMPORAL NOISE REDUCTION WITH SUB-FRAME LATENCY

(71) Applicant: Intel Corporation, Santa Clara, CA (US)

(72) Inventors: Noam Levy, Karmiel (IL); Liron Lvov, Ramat Hasharon (IL); Noam Elron, Tel Aviv (IL); Oskar Pelc, Netanya (IL); Shahar S. Yuval, Haifa (IL)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 16/141,419

(22) Filed: Sep. 25, 2018

(65) Prior Publication Data

US 2019/0045223 A1 Feb. 7, 2019

(51) Int. Cl.
*H04N 19/615* (2014.01)
*H04N 19/513* (2014.01)
*H04N 19/176* (2014.01)
*H04N 19/137* (2014.01)
*H04N 19/105* (2014.01)
*H04N 19/30* (2014.01)
*H04N 19/587* (2014.01)
*H04N 19/85* (2014.01)

(52) U.S. Cl.
CPC ........ *H04N 19/615* (2014.11); *H04N 19/105* (2014.11); *H04N 19/137* (2014.11); *H04N 19/176* (2014.11); *H04N 19/30* (2014.11); *H04N 19/521* (2014.11); *H04N 19/587* (2014.11); *H04N 19/85* (2014.11)

(58) Field of Classification Search
CPC .... H04N 19/615; H04N 19/85; H04N 19/587; H04N 19/30; H04N 19/105; H04N 19/137; H04N 19/176; H04N 19/521
See application file for complete search history.

(56) References Cited

U.S. PATENT DOCUMENTS 8,175,160 B1 * 5/2012 Arici ............... H04N 19/53
375/240.16
2005/0013509 A1 * 1/2005 Samadani ......... G06T 3/4007
382/302

OTHER PUBLICATIONS

Patras, et al., "Confidence Measures for Block Matching Motion Estimation", Proceedings from International Conference on Image Processing; Rochester, NY, pp. 287-290; Sep. 2002.

* cited by examiner

*Primary Examiner* — Tat C Chio
(74) *Attorney, Agent, or Firm* — Green, Howard & Mughal LLP.

(57) ABSTRACT

Techniques related to temporal noise reduction in captured video are discussed. Such techniques include performing motion estimation on a portion of a downsampled current frame performed during the downsampling of the current frame, replacing one or more of the resultant motion vectors based on confidence scores of the resultant motion vector, and blending the current frame and a temporally previous frame to generate a temporally filtered current frame. The temporally filtered current frame may be displayed to a user and/or encoded to generate a bitstream.

23 Claims, 9 Drawing Sheets

LOCAL MOTION COMPENSATED TEMPORAL NOISE REDUCTION WITH SUB-FRAME LATENCY

BACKGROUND

In video capture and display contexts, video quality and latency are important performance criteria. For example, imaging in automotive contexts is becoming more widespread such that vehicles are equipped with an outward looking camera that provides real time video for display to a driver in the cabin of the vehicle. The video can be displayed via a console and/or video content may replace all or portions of side and rear view mirrors with the motivation being to provide a better view for safety and, in some contexts, adding analytics for increased safety and/or an enhanced driving experience.

To attain high quality video in automotive and other contexts, especially low light environments and/or bad weather situations, motion compensated temporal filtering may be applied. However, current processing latency (i.e. >50 ms) is unacceptable as a vehicle moving at speed cannot tolerate such a latency due to safety and other concerns. For example, current global motion techniques require a full frame to be processed before temporal filtering can begin, which introduces significant processing lag (e.g., 2 or more frames) and latency such that the user is not viewing a current image. That is, the image on the screen does not represent the real world, which causes problems such as an unacceptable safety concern in the context of automotive applications.

It may be advantageous to improve temporal noise reduction processing by providing improved video quality and latency. It is with respect to these and other considerations that the present improvements have been needed. Such improvements may become critical as the desire to capture and display video data in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
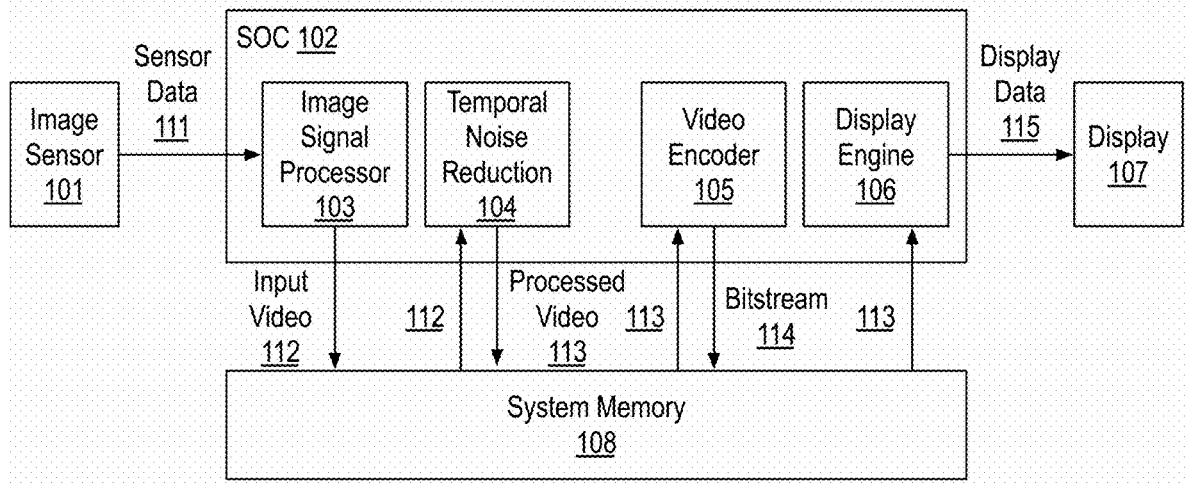
FIG. 1 is an illustrative diagram of an example system for video capture and presentment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof.

The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video capture and display and, in particular, to local motion compensated temporal noise reduction for sub-frame latency between capture and display.

As described above, in video capture and display contexts, applying high quality motion compensated temporal filtering at low latency (e.g., sub-frame latency) is advantageous. Such motion compensated temporal filtering improves subjective and objective video quality and low latency provides for an accurate representation of an environment in real time. Techniques discussed herein provide a temporal filter with on the fly motion estimation and compensation implemented using optical flow techniques, an end to end architecture including on the fly multi resolution processing, buffer chasing, and multi context processing, which allows for sub-frame latency high subjective and objective video quality specifically. The discussed techniques improve video quality significantly without adding system latency even in contexts of camera motion such as when a camera is mounted on a fast moving vehicle. Although discussed herein, in some embodiments, with respect to an automotive use case, the discussed techniques may be used in any suitable video processing application.

In some embodiments, a current frame is downsampled and only a portion of the downsampled frame is received (i.e., from memory) and processed using local motion estimation based on only the received portion to generate motion vectors for blocks of the portion. Subsequently, other portions of the downsampled frame are processed using local motion estimation based only on the pertinent portions. Furthermore, one or more of the motion vectors may be replaced using confidence scores corresponding to the motion vectors as is discussed further herein. After replacement of motion vectors, if any, a motion vector field is generated. The motion vector field may be optionally refined to a refined motion vector field by scanning a window through the downsampled current frame, another downsampled current frame (e.g., at a higher resolution than the downsampled current frame), or the current frame and iteratively optimizing, at each scan window location, a cost function based on the motion vector field within only the current window using an intra-window scan. Such techniques further allow for on the fly processing within windows of the frame such that latency may be reduced. The current frame and a previous frame are then blended based on the motion vector field to generate a temporally filtered current frame. Such blending techniques may be performed using any suitable motion compensated temporal filtering techniques. The resultant temporally filtered current frame is displayed to a user and/or encoded to a bitstream. Notably, the display to a user is prior to capture of an immediately subsequent frame of video such that sub-frame latency using fully local motion compensated temporal noise reduction is achieved. As used herein, the term sub-frame latency indicates a frame is captured and displayed or captured and ready for display to a user in a time less than the inverse of the frame capture rate.

FIG. 1 is an illustrative diagram of an example system 100 for video capture and presentment, arranged in accordance with at least some implementations of the present disclosure. As shown in FIG. 1, system 100 includes an image sensor 101, a system on a chip (SOC) 102, a system memory 108, and a display 107. Furthermore, SOC 102 includes an image signal processor 103 (which may be characterized as an ISP front end), a temporal noise reduction module 104, a video encoder 105, and a display engine 106. As shown, the techniques discussed herein implemented, in an embodiment, via SOC 102 having the capability to process visual media. For example, temporal noise reduction module 104 may be implemented in a portion of SOC 102 designed to implement a camera behavior such that SOC 102 is connected to image sensor 101 and temporal noise reduction module 104 outputs a processed video 113 (e.g., in any suitable format such as YCbCr4:2:0 format).

For example, system 100 may be exposed to a scene or environment to capture video representative of the scene or environment and system 100 may generate processed video 113 that, notably, has been temporally filtered to reduce noise by temporal noise reduction module 104. Processed video 113 may be presented to a user via display 107 and/or encoded via video encoder 105 to generate a bitstream 114, which may be stored via system memory 108. As discussed herein, a current frame of processed video 113 is displayed or ready for display prior to capture of an immediately subsequent frame via image sensor. That is, a current frame is processed and displayed or ready for display in a time less than an inverse of the frame capture rate of image sensor 101. System 100 may be implemented via any suitable device such as, for example, a motor vehicle, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform. As discussed, in an embodiment, system 100 is implemented via a motor vehicle (e.g., any automobile, truck, service vehicle, etc.). In an embodiment, display 107 is implemented via a dashboard display or the like. In an embodiment, display 107 is implemented via a housing normally provided for a rear or side view mirror or a housing including both display 107 and a mirror located in a position of rear or side view mirror. In some embodiments, the motor vehicle is self-driving and the video information used herein is not displayed but is instead used for autonomous driving decision making. In such embodiments, any suitable indicators such as driving decision indicators to steer or otherwise operate the motor vehicle may be generated based on processed video 113.

As shown, image sensor 101 generates sensor data 111 by being exposed to a scene or environment. Sensor data 111 may be any suitable data in any data format such that sensor data 111 is representative of video pictures or video frames such as pixel data or the like. In some embodiments, sensor data 111 has been demosaiced. In some embodiments, sensor data 111 has not been demosaiced and such demosaic processing is performed by image signal processor 103. Image signal processor 103 receives sensor data 111 and image signal processor 103 generates input video 112, which may also be in any suitable data format representative of video pictures or video frames.

In an embodiment, input video 112 is in a YCbCr4:2:0 format. However, any suitable format may be used. For example, any video data discussed herein may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Techniques discussed herein are discussed with respect to frames, blocks, portions, and windows for the sake of clarity of presentation. However, such frames may be characterized as pictures, video pictures, sequences of pictures, video sequences, etc. and such blocks, portions, and windows may be characterized using any suitable terms used in the art such as coding units, units, sub-units, sub-blocks, etc. For example, a picture or frame of color video data may include a luminance plane or component and two chrominance planes or components at the same or different resolutions with respect to the luminance plane. Video data discussed herein may include pictures or frames that may be divided into blocks, portions, or windows of any size, which contain data corresponding to blocks, portions, or windows of pixels. Such blocks, portions, or windows may include data from one or more planes or color channels of pixel data.

As shown, input video 112 may be stored to system memory 108 and/or memory of SOC 102 (not shown). Input video 112 is received from system memory 108 and/or memory of SOC 102 by temporal noise reduction module 104 which applies temporal noise reduction using the techniques discussed further herein to generate processed video 113, which is stored to system memory 108 and/or memory of SOC 102. Processed video 113 may be attained from system memory 108 and/or memory of SOC 102 by video encoder 105, which generates bitstream 114. Bitstream 114 may be stored to system memory 108 and/or memory of SOC 102 and bitstream 114 may be of any suitable format. For example, bitstream 114 may be a standards compliant bitstream. In addition or in the alternative, processed video 113 may be attained from system memory 108 and/or memory of SOC 102 by display engine, which generates display data 115. Display data 115 may be in any format suitable for display and display data 115 is provided to display 107 to generate a response by display 107 to display video images represented by display data 115 to a user.

Figure 2:
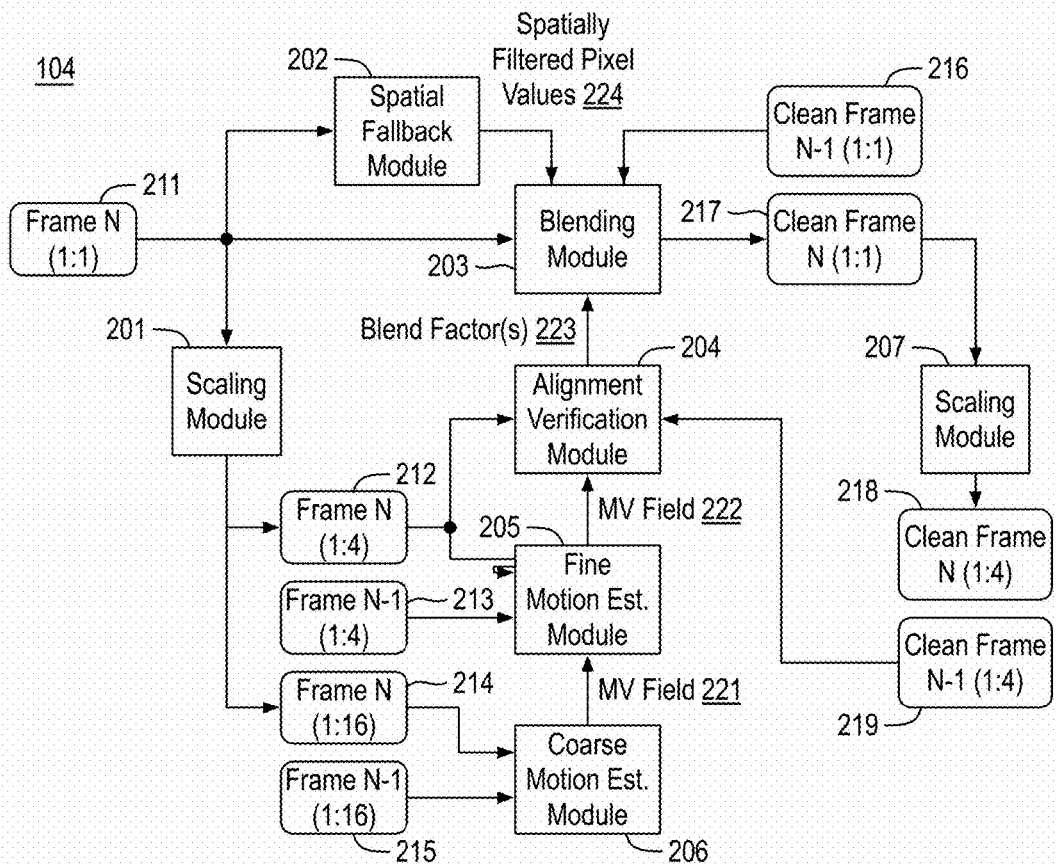
FIG. 2 is an illustrative diagram of an exemplary temporal noise reduction module.

FIG. 2 is an illustrative diagram of an exemplary temporal noise reduction module 104, arranged in accordance with at least some implementations of the present disclosure. As shown in FIG. 2, temporal noise reduction module 104 includes a scaling module 201, a spatial fallback module 202, a blending module 203, an alignment verification module 204, a fine motion estimation module 205, a coarse motion estimation module 206, and a scaling module 207. Furthermore, temporal noise reduction module 104 receives full resolution frames (e.g., frame N 211) and temporal noise reduction module 104 generates clean frames (e.g., temporal noise reduced frames such as clean frame N 217). As used herein, the term clean frame indicates a frame after temporal noise reduction using the techniques discussed herein. For example, full resolution frames are received via input video 112 and full resolution clean frames are provided as processed video 113. Furthermore, as used herein, the notation of N for a frame represents a current or selected frame and other frames in a particular order are referenced thereto such that, for example, when frame N is a current frame, frame N-1 is a temporally previous frame, when frame N is a subsequent frame, frame N-1 is a current frame, and so on.

As shown, temporal noise reduction module 104 implements a multi-resolution approach. Furthermore, temporal noise reduction module 104 implements various techniques on the fly such that processing on a portion of frame is begun prior to processing on other portions of frames (which may not yet be ready) to reduce latency.

Figure 3A:
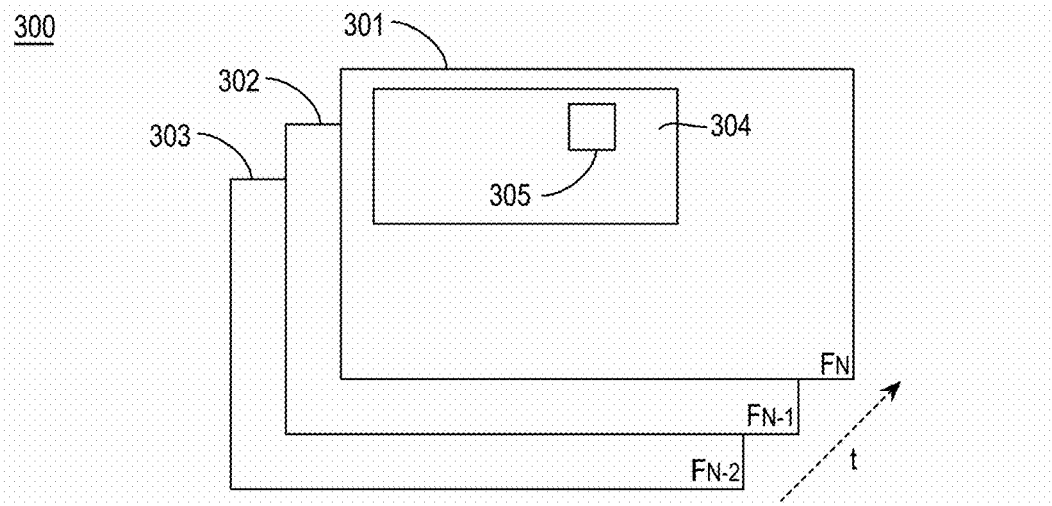
FIG. 3A illustrates exemplary video of video frames.
Figures 3B, 3C:
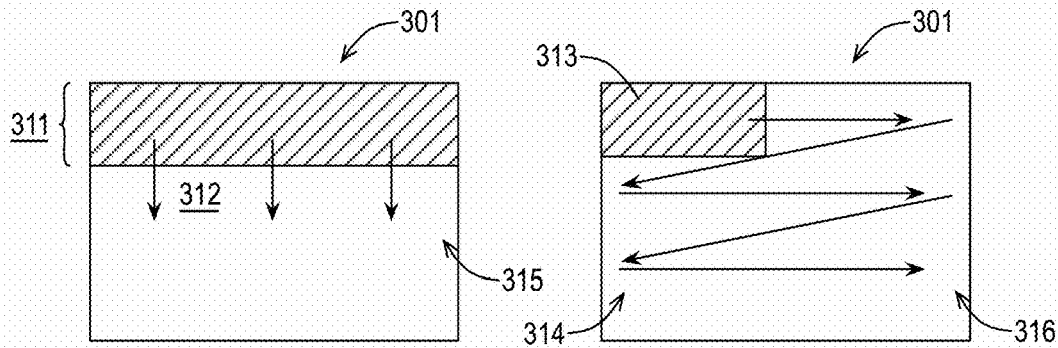
FIG. 3B, illustrates exemplary on the fly processing of an exemplary video frame first using vertically top available lines of video data.
FIG. 3C, illustrates exemplary on the fly processing of an exemplary video frame first using an upper left portion of video data.

FIG. 3A illustrates exemplary video 300 of video frames 301, 302, 303, arranged in accordance with at least some implementations of the present disclosure. FIG. 3B, illustrates exemplary on the fly processing of an exemplary video frame 301 first using vertically top available lines of video data, arranged in accordance with at least some implementations of the present disclosure. FIG. 3C, illustrates exemplary on the fly processing of an exemplary video frame 301 first using an upper left portion of video data, arranged in accordance with at least some implementations of the present disclosure.

Video frames 301, 302, 303 may include frames of any resolution and in any format as discussed herein. As shown, video frames 301, 302, 303 are sequential in time (t) such that video frame 301 is subsequent to video frame 302, which is subsequent to video frame 303, and so on to define frames in a temporal order such as $F_{N-2}$, $F_{N-1}$, $F_N$, ... and so on where such a temporal order is in a capture order, processing order, presentment order, etc. Furthermore, one or more of video frames 301, 302, 303 may be segmented into one or more portions, windows, or the like as illustrated with respect to portion 304 of video frame 301 and further into blocks as illustrated with respect to block 305 of portion 304. In the illustrated embodiment, video frame 301 is segmented into portions, which are segmented into blocks. However, any frame segmentation structure may be used that divides the frame. Furthermore, video frames 301, 302, 303 are representative of full resolution video frames or downsampled lower resolution video frame at any lower resolution discussed herein. Notably, processing of any type discussed herein may begin on a particular portion of a video frame prior to other portions being ready for processing, loaded from memory, etc.

In an embodiment, as shown with respect to FIG. 3B, a first portion 311 including any number of top lines (e.g., vertically) of video data of video frame 301 may be attained from memory and processed without use of other portion(s) 315 of video frame 301. Furthermore, processing of subsequent portions, which may be overlapping with respect to first portion 311 or discrete with respect to first portion 311 (e.g., not overlapping) are processed in a processing direction 312. As discussed, first portion 311 is processed without use of other portions 315. Furthermore, first portion 311 may be processed by a particular operation (e.g., motion estimation) using only first portion 311 while other portions 315 are being prepared and/or undergo other processing operations. For example, motion estimation may be performed for first portion 311 using only first portion 311 such that first portion 311 is downsampled video data while other portions 315 are being downsampled at least partially simultaneously with respect to the motion estimation. Although discussed with respect to motion estimation and downsampling, any adjacent processing in the discussed processing pipeline may be performed at least partially simultaneously. As processing continues, a subsequent portion (not shown) along processing direction 312 is processed, for example, using only that portion until the entirety of video frame 301 has been processed. Notably, as video frame 301 completes processing, processing of first portion 311 may have moved on to a subsequent processing operation.

In another embodiment, as shown with respect to FIG. 3C, a first portion 313 including any, for example, rectangular or square portion of video data of video frame 301 may be attained from memory and processed without use of other portion(s) 316 of video frame 301. Furthermore, processing of subsequent portions, which may be overlapping or discrete with respect to first portion 311 are processed in any suitable processing direction such as a raster scan processing direction 314. First portion 313 is processed without use of other portions 316. Furthermore, first portion 313 may be processed by a particular operation using only first portion 313 while other portions 316 are being prepared and/or undergo other processing operations. As processing continues, a subsequent portion (not shown) along, for example, raster scan processing direction 314 is processed, for example, using only that portion until the entirety of video frame 301 has been processed. Notably, as video frame 301 completes processing, processing of first portion 313 may have moved on to a subsequent processing operation.

Returning to FIG. 2, as shown, frame N 211 (e.g., at full resolution, 1:1), is received by scaling module 201, which downscales frame N 211 to one or more lower resolution frames such as lower resolution frame N 212 (e.g., downsampled by 4 in both the horizontal and vertical dimensions) and lower resolution frame N 214 (e.g., downsampled by 16 in both the horizontal and vertical dimensions). It is noted that clean frames are also downscaled as needed as shown with respect to scaling module 207. For example, scaling module 207 downscales clean frame N 217 (e.g., at full resolution, 1:1) to lower resolution clean frame N 218 (e.g., downsampled by 4 in both the horizontal and vertical dimensions). Although discussed herein with respect to 1:4 and 1:16 downsampling in both the horizontal and vertical dimensions, any suitable downsampling may be used such as 1:2 and 1:4 downsampling, 1:2 and 1:8 or 1:16 downsampling, etc. It is noted, that at a previous processing iteration, scaling module 201 downscales a temporally previous frame N-1 (not shown) to one or more lower resolution frames such as temporally previous lower resolution frame N-1 213 (e.g., downsampled by 4 in both the horizontal and vertical dimensions) and temporally previous lower resolution frame N-1 215 (e.g., downsampled by 16 in both the horizontal and vertical dimensions).

A portion of lower resolution frame N 214 (e.g., portion 311, portion 313, or the like) and a temporally previous lower resolution frame N-1 215 (e.g., also generated by scaling module 201 and stored in system memory 108) or a portion thereof are received by coarse motion estimation module 206. Coarse motion estimation module 206 performs fully local motion estimation. As used herein the term fully local motion estimation indicates motion is measured for a particular portion, region, or block and directly used. As shown, a motion vector field 221 generated based on such on the fly motion estimation is provided in an on the fly or read out manner (e.g., as generated) to fine motion estimation module 205, which is discussed further herein below.

Figure 4:
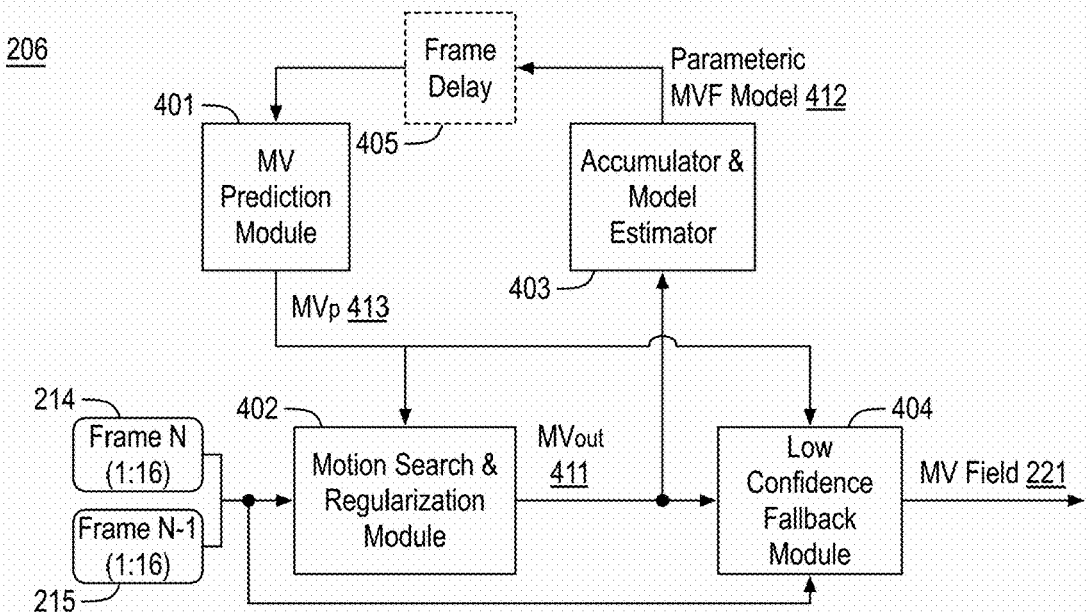
FIG. 4 is an illustrative diagram of an exemplary coarse motion estimation module.

FIG. 4 is an illustrative diagram of an exemplary coarse motion estimation module 206, arranged in accordance with at least some implementations of the present disclosure. As shown in FIG. 4, coarse motion estimation module 206 includes a motion vector (MV) prediction module 401, a motion search and regularization module 402, an accumulator and model estimator 403, and a low confidence fallback module 404. As shown, motion search and regularization module 402 receives portions of lower resolution frame N 214 and a temporally previous lower resolution frame N-1 215 and motion search and regularization module 402 generates a motion vector field ($MV_{out}$) 411 including a motion vector for each block of lower resolution frame N 214. Motion search and regularization module 402 may generate motion vector field 411 using any suitable technique or techniques such as block matching using SAD (sum of absolute differences), block matching using mean reduced SAD, cross-correlation, etc. Such techniques provide for matching any region (e.g., block) of lower resolution frame N 214.

In some embodiments, motion search and regularization module 402 generates motion vector field 411 using a block-based local search that enforces temporal consistency between neighboring (spatial and temporal) block motion vector estimates. In an embodiment, the temporal consistency measurement uses a motion vector for a temporal neighbor generated using a parametric model instead of storing and retrieving prior motion vectors, which saves on compute time and resources. In an embodiment, motion search and regularization module 402 determines a motion vector field for a portion of lower resolution frame N 214 by performing an exhaustive search for all blocks within the portion to minimize a cost function by searching within previous lower resolution frame N-1 215. For example, the cost function that is minimized may be the cost function shown in Equation (1):

$$CF(dx,dy)=SIM(dx,dy)+\lambda_t\|(dx,dy)-MV_p\|+\lambda_s \Sigma\|(dx,dy)-MV_i\| \quad (1)$$

where CF is the cost function for a particular motion vector represented by dx, dy (e.g., offsets between a block of lower resolution frame N 214 and a block of previous lower resolution frame N-1 215, SIM is a similarity metric between the block of lower resolution frame N 214 and the block of previous lower resolution frame N-1 215 referenced by dx, dy (e.g., SAD), $\lambda_t$ is a weighting factor for a temporal regularization component, $MV_p$ is a motion vector for a temporal neighbor of the block of lower resolution frame N 214 such that the temporal neighbor is a collocated block of previous lower resolution frame N-1 215, $\lambda_s$ is a weighting factor for a spatial regularization component, and $MV_i$ are motion vectors of spatially neighboring blocks of the block of lower resolution frame N 214 such that the spatially neighboring blocks are, for example, above and to the left, above, above and to the right, and/or to the left of the block of lower resolution frame N 214 within lower resolution frame N 214.

Figure 5:
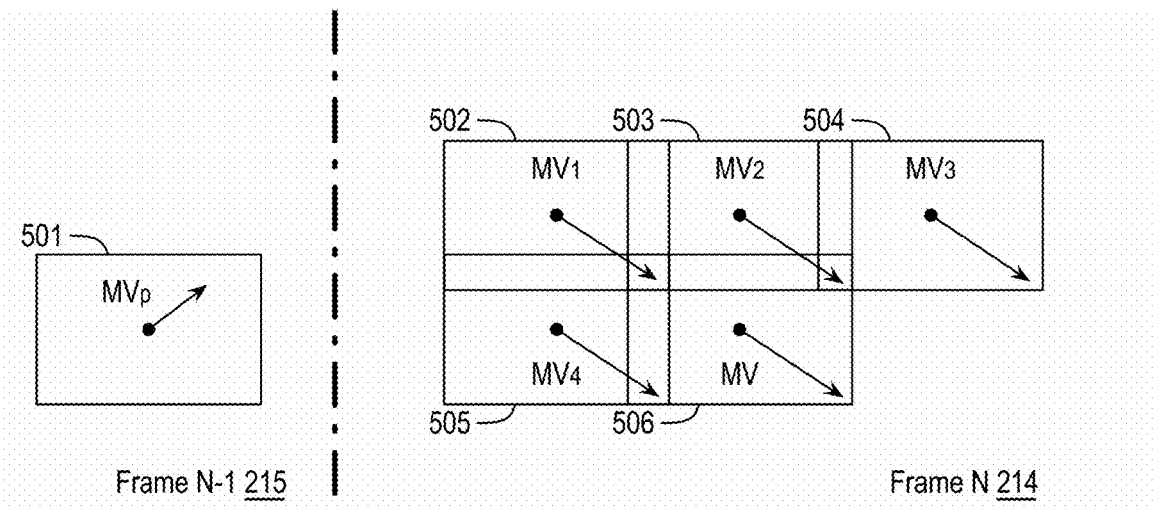
FIG. 5 illustrates temporal and spatial neighboring blocks of an exemplary block.

FIG. 5 illustrates temporal and spatial neighboring blocks of an exemplary block 506, arranged in accordance with at least some implementations of the present disclosure. As shown in FIG. 5, for block 506 (e.g., a current block, selected block, etc.) of lower resolution frame N 214, a temporal neighboring block 501 of previous lower resolution frame N-1 215 is a block that is collocated with respect to block 506. For example, block 506 and temporal neighboring block 501 are both the same horizontal and vertical distances from top left corners of lower resolution frame N 214 and previous lower resolution frame N-1 215, respectively. As shown, temporal neighboring block 501 has a motion vector, $MV_p$, corresponding thereto. As discussed below, in some embodiments, motion vector, $MV_p$, for minimization of the above cost function is not the actual MV for temporal neighboring block 501, but is instead a MV determined using a parametric model fitted to the motion vector field of previous lower resolution frame N-1 215. By using a parametric model and estimating motion vector, $MV_p$, using the parametric model, retrieval of the MV field for previous lower resolution frame N-1 215 is avoided and processing time is saved. Furthermore, FIG. 5 illustrates example spatial neighboring blocks 502, 503, 504, 505 of block 506. In the illustrated example, four spatial neighboring blocks 502, 503, 504, 505 of block 506 are used. However, any number and location of spatial neighboring blocks of block 506 may be used in the above cost function. As shown, each of spatial neighboring blocks 502, 503, 504, 505 of block 506 has a corresponding motion vector (e.g., $MV_1$, $MV_2$, $MV_3$, $MV_4$), which are applied in Equation (1).

As discussed, instead of an actual motion vector for temporal neighboring block 501, a motion vector, $MV_p$, for the block may be generated using a parametric model fitted to the motion vector field of previous lower resolution frame N-1 215. With reference to FIG. 4, accumulator and model estimator 403 generates a parametric motion vector field (MVF) model 412. Use of such techniques may provide for a compact memory representation of the parametric model (eliminating need to buffer and reload the previous motion vector field), reduction of local motion errors by fitting the parametric model to the full previous frame, and on the fly motion estimation. The parametric model may include scaling and offset, shearing, and/or affine transformation and may be represented as shown in Equation (2):

$$\begin{bmatrix} x' \\ y' \\ 1 \end{bmatrix} = M \begin{bmatrix} x \\ y \\ 1 \end{bmatrix} \quad (2)$$

where x' and y' are the motion vector after application of the parametric model, x and y are the block coordinates, and M is the parametric model (e.g., parametric motion vector field (MVF) model 412).

For example, a scaling and offset model may be used as shown in Equation (3) where the parameters in the x-dimension may be estimated as shown in Equation (4) and similarly in the y-dimension (not shown):

$$\begin{pmatrix} x' \\ y' \end{pmatrix} = \begin{pmatrix} x+dx \\ y+dy \end{pmatrix} = \begin{pmatrix} a_{10} \\ a_{20} \end{pmatrix} + \begin{pmatrix} a_{11} & 0 \\ 0 & a_{21} \end{pmatrix} \begin{pmatrix} x \\ y \end{pmatrix} \quad (3)$$

$$\begin{bmatrix} \sum_i w_i & \sum_i w_i x_i \\ \sum_i w_i x_i & \sum_i w_i x_i^2 \end{bmatrix} \begin{bmatrix} a_0 \\ a_1 \end{bmatrix} = \begin{pmatrix} \sum_i w_i x_i' \\ \sum_i w_i x_i' x_i \end{pmatrix} \quad (4)$$

where $(a_{10}, a_{11})$ and $(a_{20}, a_{21})$ are parameters of the parametric model, which can be estimated independently by Equation (4) for the x-dimension and a similar Equation (not shown) for the y-dimension solved using a least squares approach using weights $w_i$.

Returning to FIG. 4, accumulator and model estimator 403 accumulates a motion vector field for a particular lower resolution frame and estimates parametric MVF model 412 as discussed above. Parametric MVF model 412 is generated prior to a next frame and, after a frame delay 405, is ready for use to generate motion vector predictions ($MV_p$) 413 via MV prediction module 401 for motion search with temporal regularization a current lower resolution frame portion as discussed. In some embodiments, as shown, low confidence fallback module 404 may replace a resultant $MV_{out}$ for a block of lower resolution frame N 214 with $MV_p$. In an embodiment, motion search and regularization module 402 generates a confidence value for each motion vector ($MV_{out}$) of motion vector field 411 and for each motion vector ($MV_p$) of motion vector predictions 413. Such confidence values may be generated using any suitable technique or techniques. When, for a particular block, a confidence for a motion vector ($MV_p$) of motion vector predictions 413 exceeds a confidence for a motion vector ($MV_{out}$) of motion vector field 411 or the confidence for the motion vector ($MV_{out}$) of motion vector field 411 is less than a threshold, the motion vector ($MV_p$) of motion vector predictions 413 replaces the motion vector ($MV_{out}$) of motion vector field 411 for the block or is blended with the motion vector ($MV_{out}$) of motion vector field 411 for the block (e.g., via averaging) to generate a motion vector of MV field 221. The replacement or blended motion vector may be any suitable motion vector such as a motion vector for a block spatially neighboring the block (e.g., spatial neighboring blocks 502, 503, 504, 505) or a motion vector for a block of a previous frame collocated with the block (e.g., temporal neighboring block 501).

For example, coarse motion estimation module 206 may provide motion estimation as follows. For a frame N-1, a motion field, $MV_{out}(x,y)$, is estimated using regularized (both spatially and temporally) local search and a motion vector confidence, w(x,y), is associated with each block estimate. A motion model is accumulated in parallel with such motion field estimation. After accumulation, a parametric model is fit to the motion field. For a subsequent frame N, for each block, (x,y), a predicted motion vector, $MV_p$, is generated using the parametric model. The predicted motion vector, $MV_p$, is used as regularization in the motion estimation cost function for frame N (as discussed with respect to Equation (1)). In addition, if, for frame N, a motion vector confidence, w(x,y), for a motion vector, $MV_{out}(x,y)$, is low (less than a threshold or less than a confidence for the predicted motion vector, $MV_p$), the predicted motion vector, $MV_p$, is substituted for the search motion vector, $MV_{out}$ in the final motion vector field.

Figure 6:
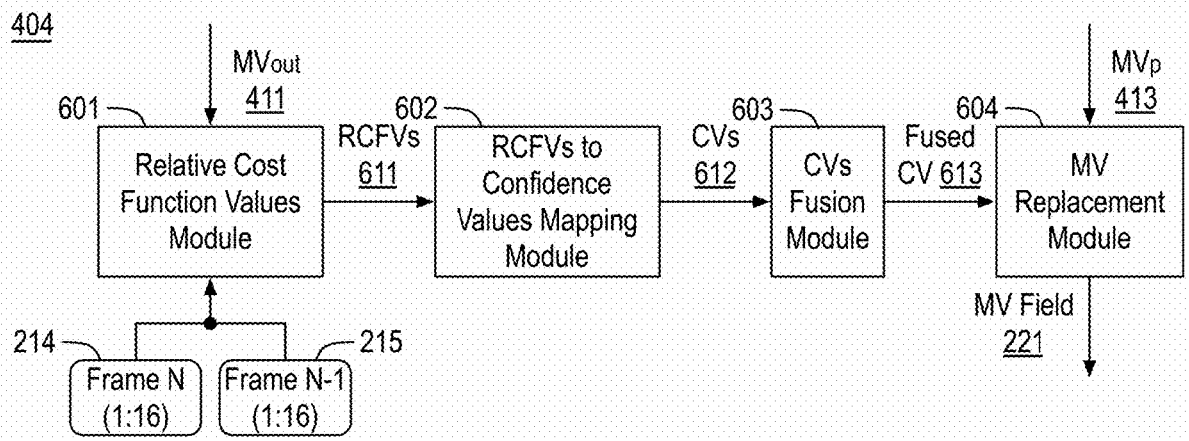
FIG. 6 is an illustrative diagram of an exemplary low confidence fallback module.

FIG. 6 is an illustrative diagram of an exemplary low confidence fallback module 404, arranged in accordance with at least some implementations of the present disclosure. As shown in FIG. 6, low confidence fallback module 404 includes a relative cost function values module 601, a relative cost function values (RCFVs) to confidence values mapping module 602, a confidence values (CVs) fusion module 603, and motion vector (MV) replacement module 604. As discussed herein, low confidence fallback module 404 determines block matching quality (confidence) based on the shape of a cost function plane associated with the motion estimation search. Motion estimation errors may arise due to lack of block content (e.g., texture, edges) or high noise levels. When confidence is low, low confidence fallback module 404 uses a motion vector from a previous collocated block in place of the motion vector having low confidence.

Figure 7:
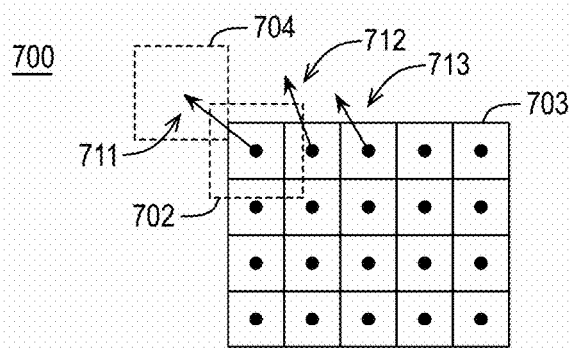
FIG. 7 illustrates exemplary block based motion estimation.

FIG. 7 illustrates exemplary block based motion estimation 700, arranged in accordance with at least some implementations of the present disclosure. As shown in FIG. 7, for a block or patch 702 in a frame such as lower resolution frame N 214, a block or patch 704 in a reference frame such as temporally previous lower resolution frame N-1 215 is referenced via motion vector 711. Similarly, for each of spatially adjacent blocks or patches 703, motion vectors 712, 713 reference a block or patch in a reference frame. As discussed, in some embodiments, for such motion vectors, confidence values corresponding thereto are generated.

Returning to FIG. 6, relative cost function values module 601 receives lower resolution frame N 214 and temporally previous lower resolution frame N-1 215, and motion vector field 411. Relative cost function values module 601 may also receive a cost function search values as discussed further herein. In an embodiment, relative cost function values module 601 receives a similarity metric between the block of lower resolution frame N 214 and the block of previous lower resolution frame N-1 215 as well as similarity metrics between the block of lower resolution frame N 214 and spatially adjacent blocks of previous lower resolution frame N-1 215 (e.g., SIM values). Relative cost function values module 601 generates relative cost function values (RCFVs) 611 as discussed below. As discussed herein, confidence in a particular motion vector may be determined based on the shape of a cost function plane of a local search used to determine the motion vector. It is noted that the cost function used to select a motion vector and the cost function used to determine the confidence value for the motion vector need not be the same. In an embodiment, the cost function used to select the motion vector includes a block similarity component, a temporal regularization component, and a spatial regularization component as discussed with respect to Equation (1) and the cost function used to determine the confidence value for the motion vector includes only the block similarity component.

Figure 8:
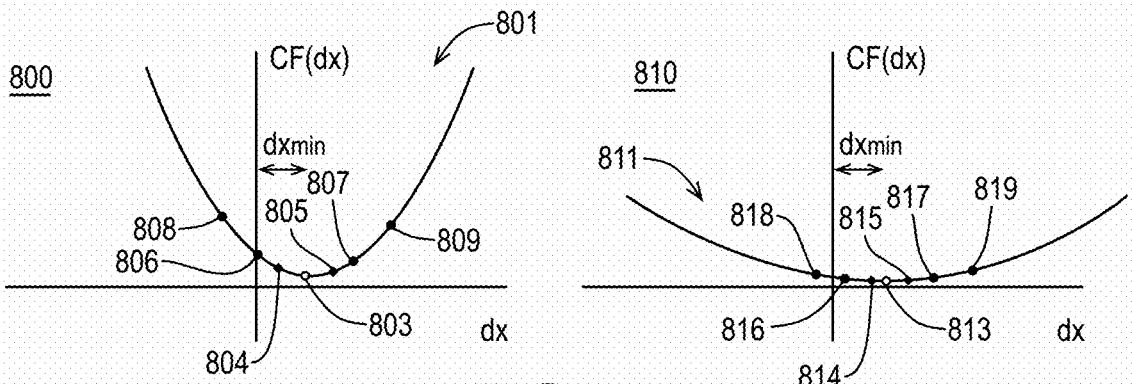
FIG. 8 illustrates exemplary cost function plane shapes.

FIG. 8 illustrates exemplary cost function plane shapes 801, 811, arranged in accordance with at least some implementations of the present disclosure. In particular, cost function plane shape 801 illustrates an example where confidence is high the motion vector is a match and cost function plane shape 811 illustrates an example where confidence is low the motion vector is a match. Both cost function plane shapes 801, 811, illustrate, in the x-direction, plots 800, 810, respectively, of cost function values (CF) on the y-axis and motion vector displacement on the x-axis. Although illustrated with respect to the x-direction only, a confidence plane is generated using x-direction and y-direction values. In particular, location 803 (illustrated with an open circle) illustrates the best match MV at $dx_{min}$ in the x-direction for cost function plane shape 801 (the best match MV also has a y-direction offset, $dy_{min}$, not shown). In cost function plane shape 801, locations 804, 805 (illustrated with filled diamonds) illustrate cost function values offset by one unit in the negative x- and positive x-directions, respectively. As discussed below, such location values may be discarded when evaluating motion vector confidence. A single unit may be a pixel displacement, fractional pixel displacement, or multiple pixel displacement. Similarly, locations 806, 807 (illustrated with filled circles) illustrate cost function values offset by two units in the negative x- and positive x-directions, respectively, and locations 808, 809 (also illustrated with filled circles) illustrate cost function values offset by two units in the negative x- and positive x-directions, respectively. Although illustrated with two values in each offset direction, any number may be used.

Similarly, in cost function plane shape 811, locations 814, 815 (illustrated with filled diamonds) illustrate cost function values offset by one unit in the negative x- and positive x-directions, respectively. Such location values may be discarded when evaluating motion vector confidence. Similarly, locations 816, 817 (illustrated with filled circles) illustrate cost function values offset by two units in the negative x- and positive x-directions, respectively, and locations 818, 819 (also illustrated with filled circles) illustrate cost function values offset by two units in the negative x- and positive x-directions, respectively.

As is discussed further herein, a confidence score is generated for a block of a frame. The confidence score is generated by evaluating a cost function value for a selected motion vector for the block (based on motion estimation such that the motion vector references a reference block) and multiple neighboring cost function values each corresponding to a block spatially neighboring the block corresponding to the selected motion vector. For example, the neighboring cost function values are those values (CF) at locations 806, 807, 808, 809, or locations 816, 817, 818, 819. In general, a more sharply sloped cost function plane shape around the location of the selected motion vector (location 803) indicates higher confidence there is a good match. Alternatively, a less sharp slope or no slope corresponds to lower confidence.

Figure 9:
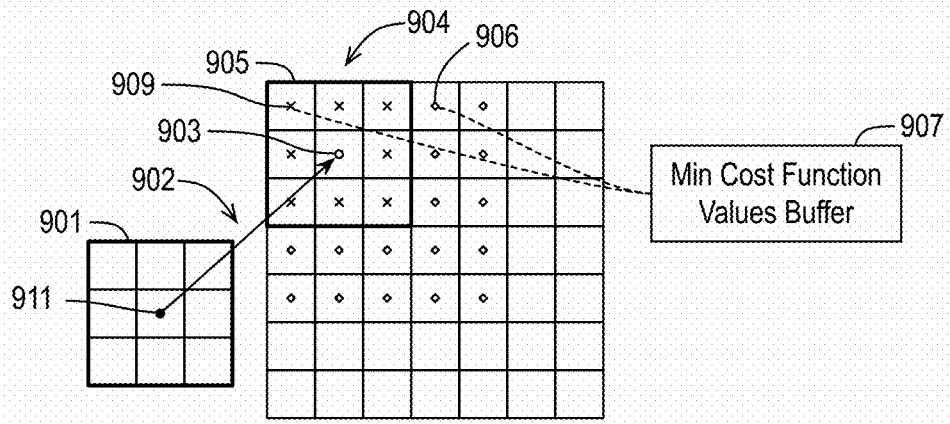
FIG. 9 illustrates exemplary neighboring cost function values relative to a best cost function value.

FIG. 9 illustrates exemplary neighboring cost function values relative to a best cost function value 903, arranged in accordance with at least some implementations of the present disclosure. As shown, for a particular block 901 of a current frame, a search of patch 904 of a reference frame has been searched with a best match in patch 904 being identified as block 905 (which may be located at any position in patch 904). The relative positions of block 901 and 905 are indicated by a motion vector 902 (e.g., having $dx_{min}$, $dy_{min}$) such that a center 911 of block 901 is mapped to a center 903 of block 905 and center 903 corresponds to a minimum cost function value. Furthermore, the block search has indicated cost values of immediately neighboring block centers as indicted by cost values 909 (each illustrated with an x) and non-immediate neighboring block centers as indicted by cost values 906 (each illustrated with an open diamond).

As shown, each of the cost values including cost values 909, 906 may be buffered in a minimum cost function values buffer 907 (e.g., as implemented by system memory 108 or SOC 102; not all cost values are shown coupled to minimum cost function values buffer 907 for the sake of clarity). As discussed, in some embodiments, immediate neighbor cost values 909 (e.g., in a 3×3 neighborhood around center 903) are discarded in the following techniques to avoid local minimum ambiguity. With reference to FIG. 6, relative cost function values module 601 receives such cost function values (or generates them via lower resolution frame N 214 and previous lower resolution frame N-1 215) and relative cost function values module 601 generates relative cost function values (RCFVs) in relation to the minimum cost function value (e.g., at location 803 or 813) to characterize match confidence.

In an embodiment, the RCFVs are determined as follows with respect to Equation (5):

$$r_i = \frac{CF_i - CF_{min}}{CF_{min} + \sigma} \quad (5)$$

where $r_i$ are the RCFVs, each for a non-discarded neighbor of the selected motion vector, $CF_i$ is the cost function value for each non-discarded neighbor, $CF_{min}$ is the cost function value for the selected motion vector, and $\sigma$ is a noise level parameter to provide a regularizing factor when $CF_{min}$ is below a noise floor. The noise level parameter may be any suitable value. In an embodiment, the noise level parameter is a constant. In an embodiment, the noise level parameter is a function of noise of lower resolution frame N 214 and/or previous lower resolution frame N-1 such that the noise level parameter increases with increasing frame noise. In an embodiment, the cost function values used in Equation (5) are based on a block similarity metric only (e.g., without use of temporal or spatial regularization) such as SAD or the like. The RCFVs discussed herein provide scene-independent configuration of relative cost function values such that calibration is not required and the discussed confidence values may be generated on the fly.

As shown in FIG. 6, relative cost function values 611 are received by RCFVs to confidence values mapping module 602, which generates confidence values (CVs) 612 based on relative cost function values 611. In an embodiment, as a neighboring relative cost function value ($r_i$) increases, the cost function minimum ($CF_{min}$) grows more distinct and confidence in the corresponding motion vector increases. In an embodiment, a monotonic increasing function is used to map relative cost function values 611 to confidence values 612. In an embodiment, relative cost function values 611 are mapped to confidence values 612 as shown in Equation (6):

$$c_i = f(r_i) \quad (6)$$

where $c_i$ are the confidence values, f is a monotonically increasing function that maps RCFVs ($r_i$) to confidence values.

The monotonically increasing function, f, may be any suitable function such as a logistic sigmoid function. In an embodiment, the function is a base-2 sigmoid function as shown in Equation (7):

$$c_i = \frac{1}{1 + 2^{-(a \log_2(r_i) + b)}} = \frac{1}{1 + \frac{1}{r_i}} \quad (7)$$

where a and b are constants. In an embodiment, a is 1 and b is 0.

Figure 10:
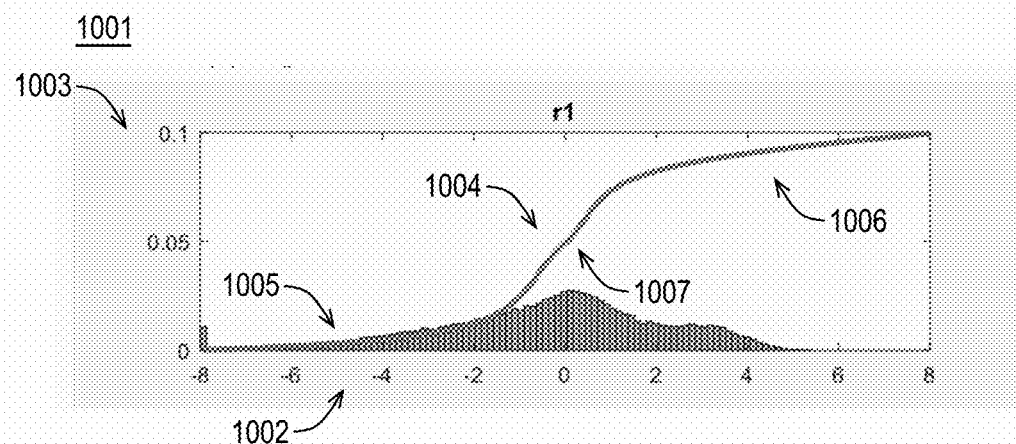
FIG. 10 illustrates an exemplary relative cost function value to confidence values mapping.

FIG. 10 illustrates an exemplary relative cost function value to confidence values mapping 1001, arranged in accordance with at least some implementations of the present disclosure. In an embodiment, a monotonic relationship between typical RCFVs and a normalized confidence range is learned offline and hardcoded for implementation. FIG. 10 illustrates a histogram of $\log_2(r_i)$ values 1002 collected over a training corpus including a wide variety of use cases and scene types mapped to a confidence range 1003 of confidence values using mapping function 1004. As shown, mapping function 1004 is, in an embodiment, a monotonically increasing logistic sigmoid function. For example, mapping function may include gradually increasing regions 1005 and 1006 and a rapidly increasing region 1007 between gradually increasing regions 1005 and 1006. As used herein, the term gradually increasing indicates a slope of less than one and rapidly increasing indicates a slope of greater than one.

Returning to FIG. 6, confidence values 612 are provided to confidence values fusion module 603, which combines confidence values 612 for neighbors of a particular motion vector into a combined or fused confidence value 613. Confidence values 612 may be combined or fused using any suitable technique or techniques. In an embodiment, confidence values 612 are combined or fused by determining a normalized sum of reciprocals of confidence values 612 to generate each fused confidence value, which is an inverse of the normalized sum of reciprocals. In an embodiment, confidence values 612 are combined or fused as shown in Equation (8):

$$\frac{1}{C} = \frac{1}{N}\left[\frac{1}{c_1} + \frac{1}{c_2} + \cdots + \frac{1}{c_N}\right] \quad (8)$$

where $c_i$ (e.g., $c_1 \ldots c_N$) are the confidence values, N is the number of confidence values being evaluated, and C is fused confidence value 613.

Returning to FIG. 6, as will be appreciated, a fused confidence value 613 may be generated for each motion vector of motion vector field 411. As shown, motion vector replacement module 604 receives fused confidence values 603 and, when the confidence is low for a particular motion vector of motion vector field 411 as indicated by a corresponding confidence value of fused confidence values 603, the motion vector is replaced. In an embodiment, the replaced motion vector is replaced by the motion vector of the collocated block in the reference frame used to generate motion vector field 411 (e.g., previous lower resolution frame N-1 215) such that the replacement motion vector is generated using a parametric model as discussed herein. In an embodiment, the confidence value for a motion vector is compared to a predetermined threshold and, when the confidence value for the motion vector compares unfavorably to the predetermined threshold (e.g., is less than, or is less than or or equal to), the motion vector is replaced. In an embodiment, a confidence value is generated for the replacement motion vector and, when the confidence value for the motion vector compares unfavorably to the confidence value for the replacement motion vector, the motion vector is replaced. After replacement of such motion vectors, a resultant motion vector field 221 is output.

As discussed, low confidence fallback module 404 provides techniques for replacing motion vectors that are associated with low confidence. Such techniques may include finding a best motion vector offset (e.g., best motion vector) that minimizes a motion estimation search cost function, extracting the minimum cost function value for the motion vector (which may or not be the same cost function used for the motion estimation search) and lowest non-immediately neighboring cost function values, determining relative cost function values (RCFVs) for the non-immediately neighboring cost function values, mapping the RCFVs to confidence scores using a monotonically increasing function, and fusing the confidence scores into a combined confidence score for the best motion vector.

Returning now to FIG. 2, as shown, motion vector field 221 is provided to fine motion estimation module 205, which also receives lower resolution frame N 212 and temporally previous lower resolution frame N-1 213. Fine motion estimation module 205 generates a motion vector (MV) field 222 such that motion vector field 222 has increased density (e.g., more MVs and more MVs per pixel) and increased accuracy with respect to motion vector field 221. Notably, fine motion estimation module 205 does not perform block matching but instead iteratively optimizes a cost function to generate motion vector field 222. In an embodiment, fine motion estimation module 205 receives motion vector field 221 prior to the entirety thereof being complete as discussed herein with respect to FIGS. 3A, 3B, and 3C. In an embodiment, fine motion estimation module 205 iteratively optimizes a global cost function for the entire lower resolution frame N 212 using only the current scan window 1202 and then repeats such processing for a moving window through lower resolution frame N 212. As used herein, the term global cost function indicates a cost function that is defined for an entirety of frame being processed (while the optimization is performed using only information within the current window). As discussed below, fine motion estimation module 205 breaks down a frame into portions or windows and uses a global optimization procedure within each portion or window. The portion or window then slides through the frame thereby optimizing the global cost function via changes within each portion or window.

Figure 11:
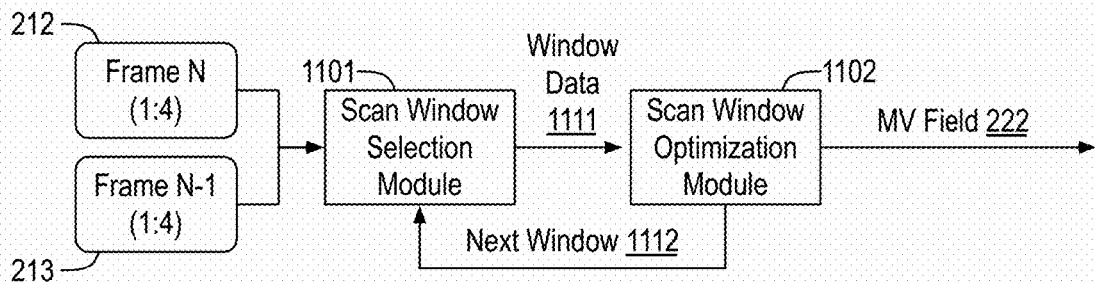
FIG. 11 is an illustrative diagram of an exemplary fine motion estimation module.

FIG. 11 is an illustrative diagram of an exemplary fine motion estimation module 205, arranged in accordance with at least some implementations of the present disclosure. As shown in FIG. 11, fine motion estimation module 205 includes a scan window selection module 1101 and a scan window optimization module 1102 and fine motion estimation module 205 generates motion vector field 222. As shown, scan window selection module 1101 selects a widow within lower resolution frame N 212.

Figure 12:
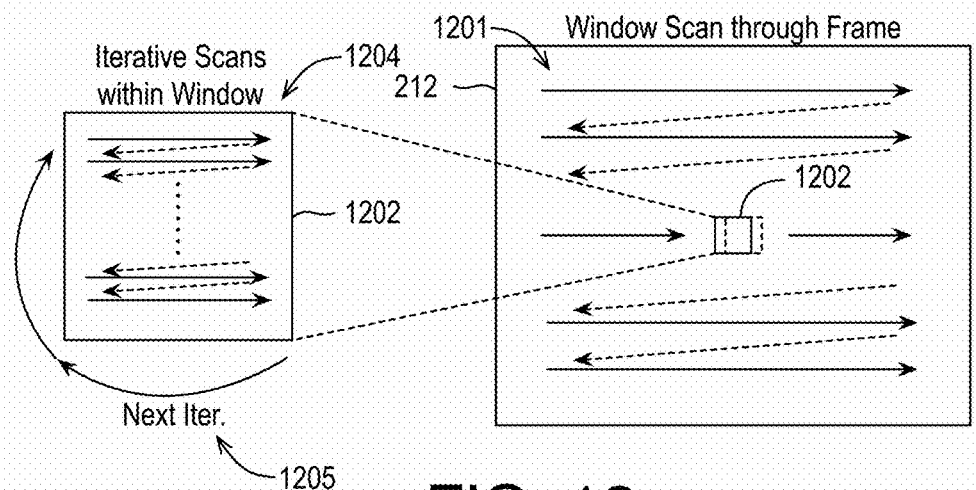
FIG. 12 illustrates exemplary scan window selection and within window processing.

FIG. 12 illustrates an exemplary scan window 1202 selection and within window processing, arranged in accordance with at least some implementations of the present disclosure. As shown in FIG. 12, a scan window 1202 may be defined within lower resolution frame N 212. In an embodiment, scan window 1202 begins at an upper left corner of lower resolution frame N 212 and traverses lower resolution frame N 212 in a raster scan pattern 1201. Scan window 1202 may have any suitable size and shape such as square or rectangular. In some embodiments, scan window 1202 is 64×64 or 128×128 pixels.

Returning to FIG. 11, as shown, scan window optimization module 1102 receives data corresponding to scan window 1202 as window data 1111. Window data 1111 may include any suitable data needed to optimize a global motion vector cost function model using scan window 1202 such as pixel data from lower resolution frame N 212, pixel data from previous lower resolution frame N-1 213, and cost function modeling parameters. In an embodiment, a global (e.g., full frame) cost function is defined and optimized with respect to scan window 1202 and the cost function is minimized via iterative intra-window scans within scan window 1202 such that only scan window 1202 is used for each global optimization. The cost function may be any suitable cost function including cost function components such as a pixel matching cost component (e.g., SAD), a motion vector variance cost component (e.g., squared deviation from a mean motion vector), a motion vector local variance component (e.g., squared sum of deltas between adjacent motion vectors), etc., which may be combined via weighted averaging to generate a global cost for scan window 1202 based on a particular set of motion vectors. In an embodiment, the cost function is an optical flow cost function. In an embodiment, the cost function is a TV-L1 optical flow cost function. Scan window optimization module 1102 minimizes the cost function by modifying the set of motion vectors until a lowest cost combination of motion vectors for the global cost function is determined. As will be appreciated such a cost function is complex and cross-coupled in a non-trivial manner throughout scan window 1202 and lower resolution frame N 212.

Figure 13:
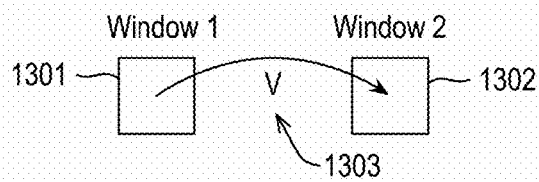
FIG. 13 illustrates an exemplary scan window motion estimation.

FIG. 13 illustrates an exemplary scan window motion estimation 1300, arranged in accordance with at least some implementations of the present disclosure. As shown in FIG. 13, scan window motion estimation 1300 may provide, between window 1 1301 (e.g., a base picture window $P_b(x)$) and window 2 1302 (e.g., a destination picture window $P_d(x)$), motion 1303 (e.g., $V(x)$) such that motion 1303 describes translation or motion from the base picture window to the destination picture window with x being coordinates within the base picture window.

Returning to FIG. 11, in an embodiment, scan window optimization module 1102 determines such lowest cost combination of motion vectors for the global cost function through an iterative optimization that limits changes of each motion vector such that the motion vectors are changed and optimized in a raster scan order throughout scan window 1202. Such raster scanning is iteratively repeated until no or minimal change in the global cost function is attained and/or after a maximum number of iterations are performed.

With reference to FIG. 12, within scan window 1202, any number of iterative optimizations within scan window 1202 are performed in a raster scan order 1204 (or any other suitable order) and next iterations 1205 are performed until, as discussed, no or minimal change in the cost function is attained and/or after a maximum number of iterations are performed. As shown in FIG. 12, scan window 1202 scans through lower resolution frame N 212 (e.g., the full image) only once, such that only a few rows of lower resolution frame N 212 are needed in internal memory (e.g., the height of lower resolution frame N 212) and lower resolution frame N 212 may be accessed from system memory 203 (e.g., external memory) only once. Furthermore, since there is only a single scan through lower resolution frame N 212, the optimization is performed with minimal impact on the system latency. Such techniques further perform well-controlled frame wide optimization. As shown in FIG. 12, in some embodiments, each scan movement of scan window 1202 at least partially overlaps the previous scan window.

Returning to FIG. 11, as shown, scan window optimization module 1102 requests a next window via next window signal 1112 until a last window has been processed. Furthermore, scan window optimization module 1102 provides motion vector field 222. As discussed herein, motion vector field 222 may be provided while processing of lower resolution frame N 212 such that motion vectors for completed portions of lower resolution frame N 212 are provided as output while other portions of lower resolution frame N 212 are processed.

Returning to FIG. 2, as shown, motion vector field 222 is provided to alignment verification module 204, which also receives lower resolution frame N 212 and temporally previous lower resolution clean frame N-1 219. Alignment verification module 204 provides one or blend factors 223. As discussed alignment verification module 204 may process motion vector 222 as it is completed by fine motion estimation module 205. For example, alignment verification module 204 and fine motion estimation module 205 may perform processing for lower resolution frame N 212 at least partially in parallel.

Alignment verification module, based on lower resolution frame N 212, temporally previous lower resolution clean frame N-1 219, and motion vector field 222 determines a risk or confidence as to whether lower resolution frame N 212 and temporally previous lower resolution clean frame N-1 219 (as matched by motion vector field 222) are aligned and/or match. For example, if lower resolution frame N 212 and temporally previous lower resolution clean frame N-1 219 (as matched by motion vector field 222) are well aligned and/or matched, temporally previous clean frame N-1 216 may be used more in the temporal filtering applied by blending module 203. Such use may be indicated by blend factor(s) 223, which indicates a blending strength for use of temporally previous clean frame N-1 216 in the blending (temporal filtering. For example, a strong match may be indicated by a higher blend factor 223. Alternatively, when lower resolution frame N 212 and temporally previous lower resolution clean frame N-1 219 (as matched by motion vector field 222) are not well aligned and/or matched, a low or zero blending factor 223 may be provided to indicate temporally previous clean frame N-1 216 is not to be used (e.g., little or no temporal filtering is to be applied). Alignment verification module 204 may verify alignment using any suitable technique or techniques. As discussed, alignment verification module 204 may verify alignment in real time (e.g., as MV filed is generated) and at lower resolution. In an embodiment, alignment verification module 204 verifies alignment using block matching similar to motion estimation but without search. In an embodiment, alignment verification module 204 determines regions of mismatch between lower resolution frame N 212 and temporally previous lower resolution clean frame N-1 219. In an embodiment, blend factors 223 may indicate some portions are to be blended more strongly than other portions (e.g., revealed occlusions). Furthermore, such regions may be indicated to spatial fallback module 202, which may provide spatial filtering in such regions, as discussed further herein below.

As shown, blend factors 223 are provided to blending module 203, which also receives frame N 211 and temporally previous clean frame N 217. Blending module 203 blends frame N 211 and temporally previous clean frame N 217 based on blend factors 223 using any suitable temporal filtering techniques such as weighted pixel averaging or the like. In an embodiment, blend factors 223 provide, for different regions of frame N 211 weighting values for weighting pixel values of temporally previous clean frame N 217 in the blending. In an embodiment, a value of 0 indicates temporally previous clean frame N 217 is not to be used (e.g., due to a mismatch) and a value of 1 indicates temporally previous clean frame N 217 is to be used to a maximum weighting amount.

As shown, blending module 203 further receives spatially filtered pixel values 224 from spatial fallback module 202. For example, for those regions of previous clean frame N 217 that are not to be used in blending (e.g., revealed occlusions), spatial filtering may be applied as a fallback to avoid noise level mismatches (e.g., signal to noise ratio dip, SNR-dip) in such regions. Such spatial filtering may be provided using any suitable spatial filtering technique or techniques such as blurring techniques or the like. In some embodiments, such spatial filtering includes application of a spatial bilateral infinite impulse response (IIR) filter as discussed further herein below. For example, in some embodiments, a spatial bilateral IIR filter is combined with a finite impulse response (FIR) filter to achieve high denoise power at a low area cost. The IIR filter use provides for the output of a previous line is used as input to the filtering of the current line thereby compounding denoise power.

Figure 14:
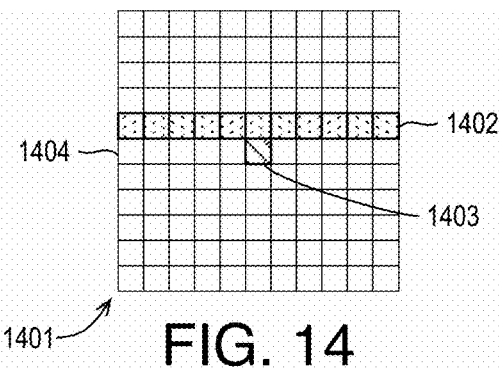
FIG. 14 illustrates example horizontal support from a previous pixel line for filtering a current pixel to be filtered.

FIG. 14 illustrates example horizontal support from a previous pixel line 1402 for filtering a current pixel to be filtered 1403, in accordance with at least some implementations of the present disclosure. As shown in FIG. 14, for a pixel to be filtered 1403 (as illustrated with cross hatching) along a horizontally aligned line of pixels 1404 of a patch of pixels 1401, a previously filtered horizontal support line of pixels 1402 that is immediately vertically adjacent with respect to pixel to be filtered 1403 may be used support filtering of pixel to be filtered 1403. The spatial filtering techniques discussed herein provide SNR-dip reduction or elimination in reveled occlusion areas with vertical IIR with horizontal support providing diagonal propagation of filtered pixels, improved robustness under diagonal edges, and, by combining a recursive IIR filter, high quality low-frequency noise reduction that is area, memory, and power efficient.

Figure 15:
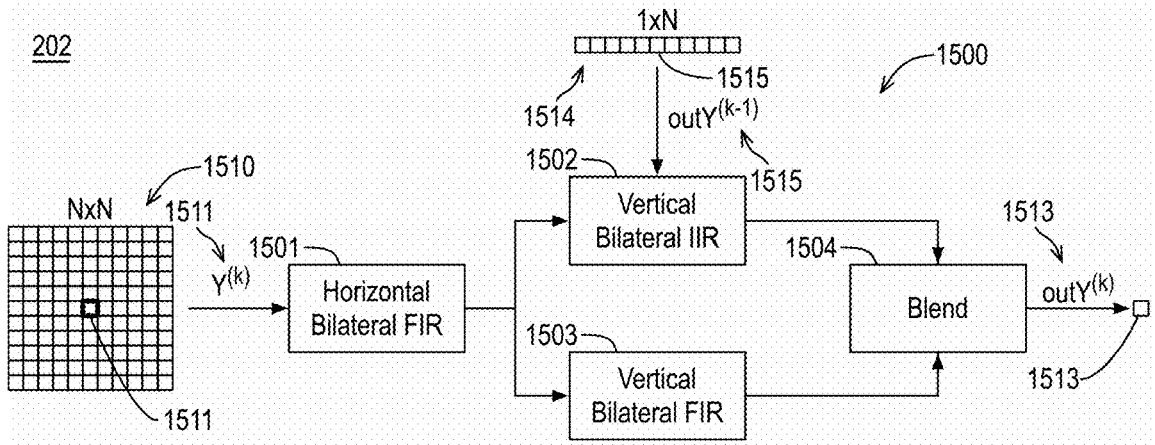
FIG. 15 is an illustrative diagram of an exemplary luma filter component of spatial fallback module.

FIG. 15 is an illustrative diagram of an exemplary luma filter component 1500 of spatial fallback module 202, arranged in accordance with at least some implementations of the present disclosure. As discussed, spatial fallback module 202 may operate on a portion 1510 of frame N 211 as indicated by alignment verification module 204. For example, portion 1510 may be a revealed occlusion or the like of frame N 211, for which temporal filtering is not to be applied. As shown in FIG. 15, luma filter component 1500 includes a horizontal bilateral FIR filter 1501, a vertical bilateral IIR filter 1502, a vertical bilateral FIR filter 1503, and a blend module 1504 and luma filter component 1500 generates, for a pixel to be filtered ($Y^{(k)}$) 1511 in the luma plane, an output pixel (out$Y^{(k)}$) 1513 in the luma plane. As used herein, the term pixel may indicate any suitable pixel value in the pertinent plane (e.g., Y or luma plane, U or first chroma plane, or V or second chroma plane).

As shown, luma filter component 1500 is composed of a separable FIR bilateral filter (i.e., horizontal bilateral FIR filter 1501 and vertical bilateral IIR filter 1502) blended (i.e., by blend module 1504) with vertical bilateral FIR filter 1503 (please refer to FIG. 1). The bilateral filters rely strongly on the second moment statistic of the noise, which is assumed to depend on the signal intensity of a portion 1510. As shown, horizontal bilateral FIR filter 1501 is first applied on portion 1510. Next, vertical bilateral IIR filter 1502 is applied to the output of horizontal bilateral FIR filter 1501. Such separable filter techniques combined with edge preserving bilateral filtering advantageously provides cleaner horizontal edges than non-separable filter techniques method and advantageously is more computationally efficient in operation. Furthermore, output pixels of a previous row 1514 in the horizontal support are filtered together via vertical bilateral IIR filter 1502 with bilateral weights determined against the horizontally filtered center pixel 1515 (out$Y^{(k-1)}$) of previous row 1514. Vertical bilateral IIR filter 1502 also filters the output pixels horizontally, thereby providing stronger filtering. Vertical bilateral IIR filter 1502 output and vertical bilateral FIR filter 1503 output are blended together via blend module 1504 based on a IIR power weight, which may be predetermined, to create output pixel 1513. In an embodiment, the IIR power weight balances both filters to avoid artifacts.

Figure 16:
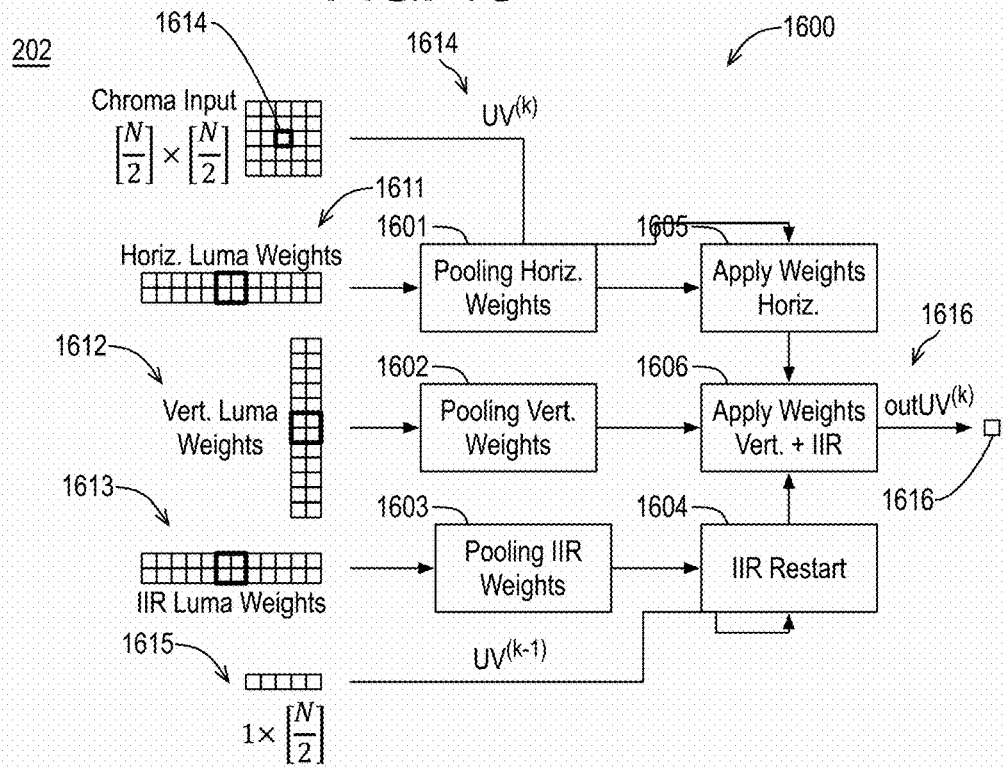
FIG. 16 is an illustrative diagram of an exemplary chroma filter component of spatial fallback module.

FIG. 16 is an illustrative diagram of an exemplary chroma filter component 1600 of spatial fallback module 202, arranged in accordance with at least some implementations of the present disclosure. As shown, to incorporate edge information from the luma channel into chroma filter component 1600 and avoid repeating calculations, chroma filter weights are determined using luma filter weights. Chroma weights of all filters—horizontal bilateral FIR weights 1611, vertical bilateral FIR weights 1612, and vertical bilateral IIR weights 1613—are determined by a minimum operation over 2×2 luma weights (e.g., min pooling) via pooling horizontal FIR weights module 1601, pooling vertical FIR weights module 1602, and pooling IIR weights module 1603, respectively. Furthermore, to address high contrast information (e.g., edges) also in the chromatic channels, a bilateral weight is determined in the chroma channel from input 1615 and used to attenuate the luma weights as needed via IIR restart module 1604. Also as shown, horizontal FIR chroma weights and vertical FIR weights and IIR weights are applied to a pixel to be filtered 1614 in the chroma planes ($UV^{(k)}$) via horizontal FIR chroma weights application module 1605 and vertical FIR weights and IIR weights application module 1606, respectively, to generate an output pixel in the chroma planes ($outUV^{(k)}$).

Figure 17:
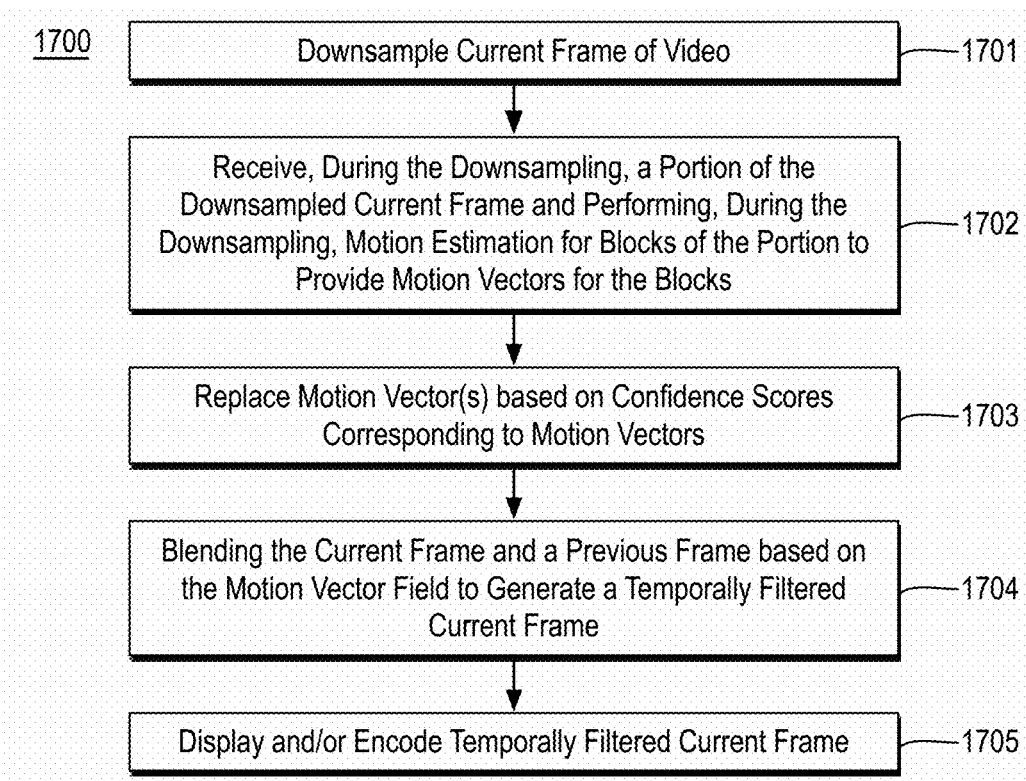
FIG. 17 is a flow diagram illustrating an example process for performing local motion compensated temporal noise reduction with sub-frame latency.

FIG. 17 is a flow diagram illustrating an example process 1700 for performing local motion compensated temporal noise reduction with sub-frame latency, arranged in accordance with at least some implementations of the present disclosure. Process 1700 may include one or more operations 1701-1705 as illustrated in FIG. 17. Process 1700 may form at least part of a video coding process. By way of non-limiting example, process 1700 may form at least part of a temporal noise reduction process as performed by any device or system as discussed herein such as system 100 or any other system, device, or component discussed herein. Furthermore, process 1700 will be described herein with reference to system 1800 of FIG. 18.

Figure 18:
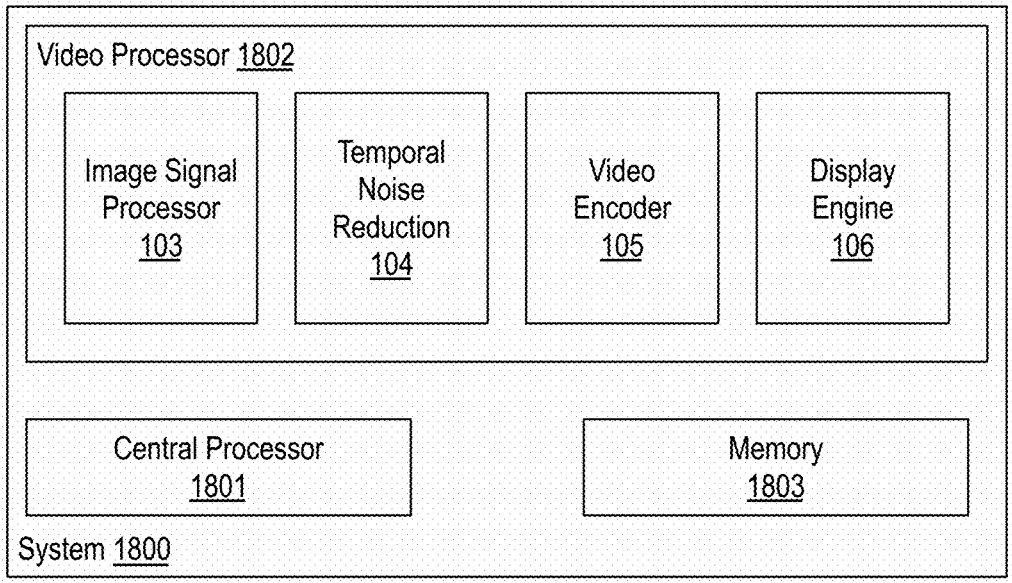
FIG. 18 is an illustrative diagram of an example system for performing local motion compensated temporal noise reduction with sub-frame latency.

FIG. 18 is an illustrative diagram of an example system 1800 for performing local motion compensated temporal noise reduction with sub-frame latency, arranged in accordance with at least some implementations of the present disclosure. As shown in FIG. 18, system 1800 may include a central processor 1801, a video processor 1802, and a memory 1803. Also as shown, video processor 1802 may include or implement image signal processor 103, temporal noise reduction module 104, video encoder 105, and display engine 106. In an embodiment, memory 1803 implements system memory 108. Furthermore, in the example of system 1800, memory 1803 may store video data or related content such as frame or image data, motion vectors, motion vector fields, confidence values, blend factors, filter weights, and/or any other data as discussed herein.

As shown, in some embodiments, image signal processor 103, temporal noise reduction module 104, video encoder 105, and display engine 106 are implemented via video processor 1802. In other embodiments, one or more or portions of image signal processor 103, temporal noise reduction module 104, video encoder 105, and display engine 106 are implemented via central processor 1801 or another processing unit such as an image processor, a graphics processor, or the like.

Video processor 1802 may include any number and type of video, image, or graphics processing units that may provide the operations as discussed herein. Such operations may be implemented via software or hardware or a combination thereof. For example, video processor 1802 may include circuitry dedicated to manipulate pictures, picture data, or the like obtained from memory 1803. Central processor 1801 may include any number and type of processing units or modules that may provide control and other high level functions for system 1800 and/or provide any operations as discussed herein. Memory 1803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1803 may be implemented by cache memory.

In an embodiment, one or more or portions of image signal processor 103, temporal noise reduction module 104, video encoder 105, and display engine 106 are implemented via an execution unit (EU). The EU may include, for example, programmable logic or circuitry such as a logic core or cores that may provide a wide array of programmable logic functions. In an embodiment, one or more or portions of image signal processor 103, temporal noise reduction module 104, video encoder 105, and display engine 106 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 17, process 1700 begins at operation 1701, where a current frame of video is downsampled to generate a downsampled current frame. The current frame may be downsampled using any suitable technique or techniques to any suitable lower resolution such as 1 to 4 downsampling in both the x- and y-directions, 1 to 16 downsampling in both the x- and y-directions, etc.

Processing continues at operation 1702, where, during said downsampling, a portion of the downsampled current frame is received and, also during said downsampling, motion estimation is performed for blocks of the portion using only the portion to provide a plurality of motion vectors for the plurality of blocks. For example, block matching techniques may be used to determine the motion vectors for the blocks of the portion. As discussed herein, such motion estimation during downsampling as well as performing motion estimation on downsampled frames may, in part, provide for sub-frame latency of temporal noise reduction in video. The motion estimation may be performed using any suitable technique or techniques. In an embodiment, the motion estimation includes block matching techniques. In an embodiment, the motion estimation includes cross correlation techniques.

In an embodiment, performing the estimation for a first block of blocks includes determining multiple cost function values each for a reference block (of multiple reference blocks in, for example, a search area or region) of a downsampled previous frame relative to the first block such that each cost function value includes a block similarity component, a temporal regularization component, and a spatial regularization component. In an embodiment, the temporal regularization component includes a difference between a candidate motion vector and a motion vector for a first reference block in the downsampled previous frame collocated with the first block. In an embodiment, process 1700 further includes fitting a linear parametric motion model to a motion vector field for the previous downsampled frame and determining the motion vector for the first reference block in the downsampled previous frame using the linear parametric motion model.

Processing continues at operation 1703, where one or more of motion vectors are replaced based on confidence scores corresponding to the plurality of motion vectors to generate a motion vector field. For example, the motion vector field includes at least the motion vectors determined at operation 1702 with some of such motion vectors being replaced. In an embodiment, replacing one of motion vectors includes replacing the motion vector for a first block with one of a motion vector for a block spatially neighboring the first block or a motion vector for a block of the previous frame that is collocated with the first block. For example, the spatially neighboring block may be above, above to the left, to the left, etc. of the first block within the same frame. In an embodiment, process 1700 further includes generating a confidence score of the confidence scores for a block of the current frame by evaluating a first cost function value for a first motion vector of the plurality of motion vectors such that the first motion vector is a selected motion vector for the first block based on the motion estimation performed at operation 702 and the first motion vector references a first reference block of a downsampled previous frame, and a plurality of neighboring cost function values each corresponding to the first block relative to spatial neighbors of the first reference block to determine the confidence score. In an embodiment, evaluating the first cost function value and the plurality of neighboring cost function values includes determining relative cost function values, one for each of the plurality neighboring cost function values, using the neighboring cost function value and the first cost function value, mapping the relative cost function values to confidence scores using a mapping function, and combining the plurality of confidence scores to generate the confidence score. In an embodiment, a relative cost function value of the relative cost function values includes a difference between a neighboring cost function value and the cost function value normalized using the cost function value. In an embodiment, the mapping function is a logistic sigmoid function. In an embodiment, combining the confidence scores includes determining a sum of reciprocals of the confidence scores. In an embodiment, the confidence score is the inverse of the sum of reciprocals of the confidence scores.

In an embodiment, prior to operation 1704, the motion vector field is refined and the blending discussed at operation uses the refined motion vector field. In an embodiment, refining the motion vector field to generate the refined motion vector field includes scanning a window through the downsampled current frame, a second downsampled current frame, or the current frame and iteratively optimizing, at each scan window location, a global cost function using the motion vector field within only the current window using an intra-window scan. For example, the refining may be performed at the resolution of the downsampled current frame, a resolution of another downsampled current frame (having a higher resolution than the downsampled current frame but a lower resolution than the current frame), or at the resolution of the current frame itself. In an embodiment, the iterative updates are local (e.g., involving the part of the motion field within the scan window) but the cost function being optimized is global (e.g., based on the motion vectors in the full frame and cross-coupled in a through the full frame, and not only within the scan window). Such local update and global cost function optimization is practical (e.g., computationally efficient) and provides precision (by optimizing a global cost function).

Processing continues at operation 1704, where the current frame and a previous frame of the video are blended based on the motion vector field to generate a temporally filtered current frame. For example, the previous frame may be any temporally previous frame (either immediately temporally previous or before the immediately temporally previous frame). Such blending may be performed using any suitable temporal noise reduction blending techniques. In an embodiment, process 1700 further includes verifying alignment between the current frame and the previous frame and, when at least a region of the current frame and the previous frame are misaligned, performing spatial filtering for a target pixel in the region of the current frame by applying a separable horizontal and vertical finite impulse response filters to the target pixel, determining weights for a vertical infinite response filter using a previous row of pixels relative to the target pixel, applying the vertical infinite response filter to the target pixel, and blending the separable horizontal and vertical finite impulse response filtered pixel and the vertical infinite response filtered pixel to generate a resultant pixel.

Processing continues at operation 1705, where the temporally filtered current frame generated at operation is displayed to a user and/or encoded to generate a bitstream. In an embodiment, displaying the temporally filtered current frame is prior to capture of a temporally subsequent frame of the video. For example, display time to a user from frame capture may be less than the time between frame captures such that sub-frame latency is achieved.

Process 1700 may be repeated any number of times either in series or at least partially in parallel for any number of subsequent temporal frames. As discussed, process 1700 may provide local motion compensated temporal noise reduction with sub-frame latency.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 19:
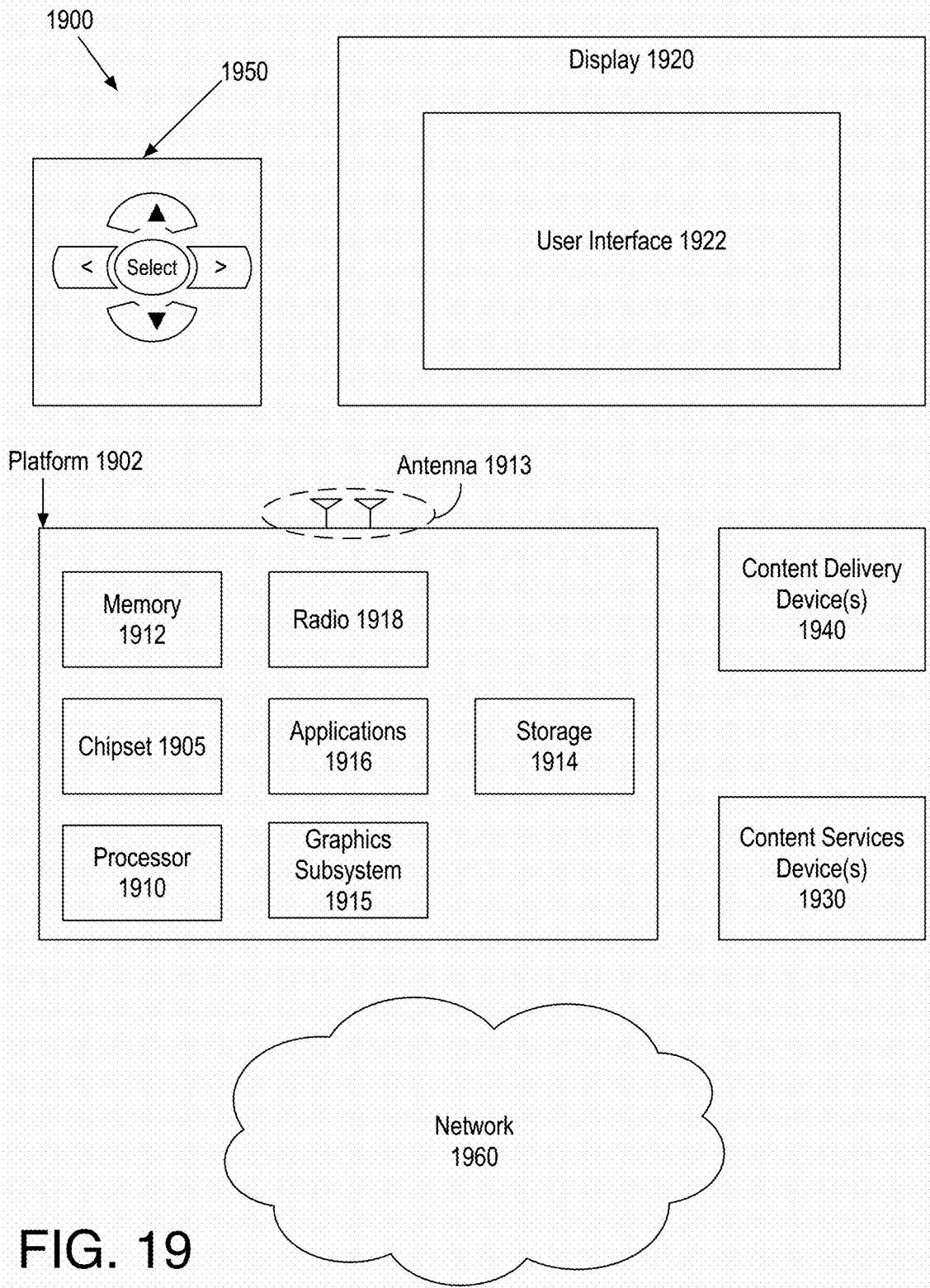
FIG. 19 is an illustrative diagram of an example system.

FIG. 19 is an illustrative diagram of an example system 1900, arranged in accordance with at least some implementations of the present disclosure. In various implementations, system 1900 may be implemented in a motor vehicle context such that display 1920 is implemented in a console of the motor vehicle and/or in a rear view mirror and/or side view mirror(s) of the motor vehicle although system 1900 is not limited to this context. For example, system 1900 may be incorporated into an autonomous motor vehicle platform (e.g., without a display for use by a driver), a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1900 includes a platform 1902 coupled to a display 1920. Platform 1902 may receive content from a content device such as content services device(s) 1930 or content delivery device(s) 1940 or other similar content sources. A navigation controller 1950 including one or more navigation features may be used to interact with, for example, platform 1902 and/or display 1920. Each of these components is described in greater detail below.

In various implementations, platform 1902 may include any combination of a chipset 1905, processor 1910, memory 1912, antenna 1913, storage 1914, graphics subsystem 1915, applications 1916 and/or radio 1918. Chipset 1905 may provide intercommunication among processor 1910, memory 1912, storage 1914, graphics subsystem 1915, applications 1916 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, DisplayPort, wireless HDMI, and/or wireless HD compliant techniques. Graphics subsystem 1915 may be integrated into processor 1910 or chipset 1905. In some implementations, graphics subsystem 1915 may be a stand-alone device communicatively coupled to chipset 1905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1918 may operate in accordance with one or more applicable standards in any version.

In various implementations, display 1920 may include any television type monitor or display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

In various implementations, content services device(s) 1930 may include a cable television box, personal computer, network, telephone, Internet enabled devices or appliance capable of delivering digital information and/or content, and any other similar device capable of uni-directionally or bi-directionally communicating content between content providers and platform 1902 and/display 1920, via network 1960 or directly. It will be appreciated that the content may be communicated uni-directionally and/or bi-directionally to and from any one of the components in system 1900 and a content provider via network 1960. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features may be used to interact with user interface 1922, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features may be replicated on a display (e.g., display 1920) by movements of a pointer, cursor, focus ring, or other visual indicators displayed on the display. For example, under the control of software applications 1916, the navigation features located on navigation may be mapped to virtual navigation features displayed on user interface 1922, for example. In various embodiments, may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various embodiments, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various embodiments, system 1900 may be implemented as a wireless system, a wired system, or a combination of both. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 19.

Figure 20:
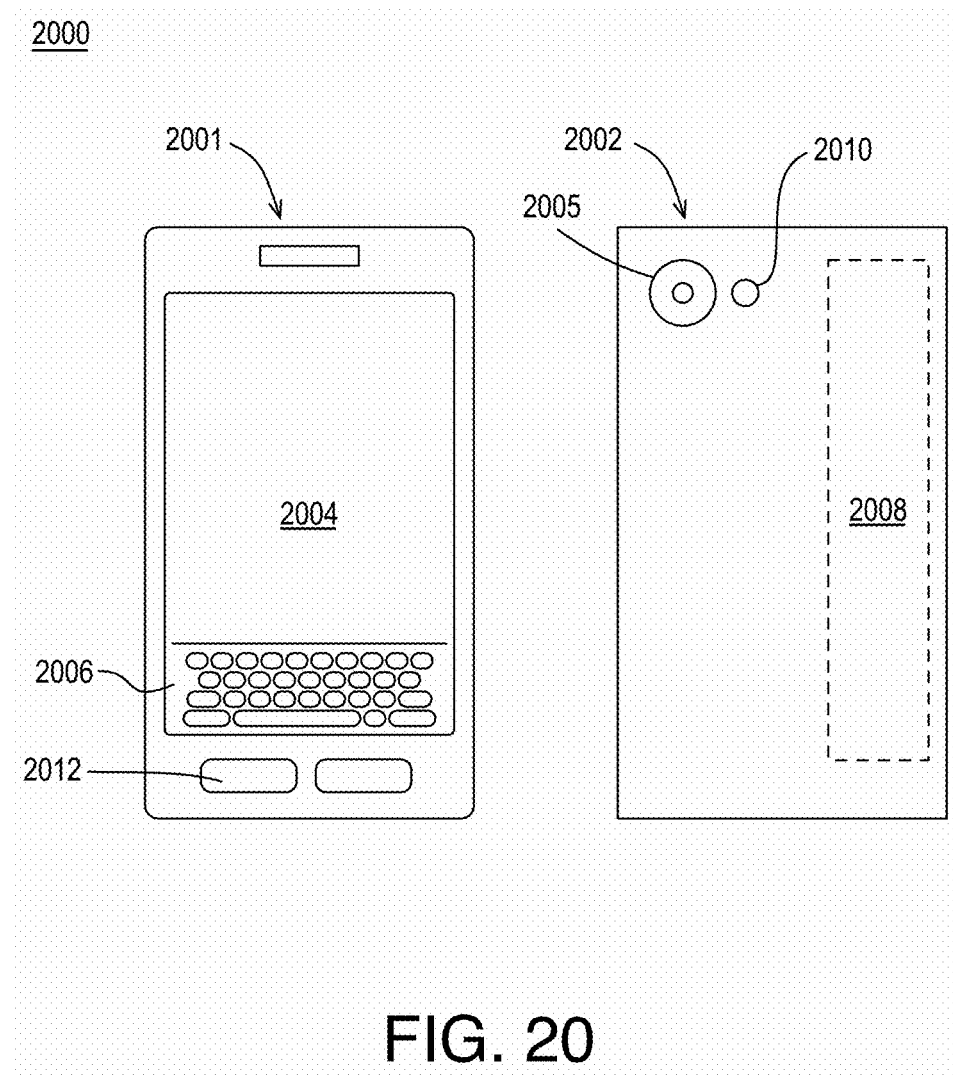
FIG. 20 illustrates an example device, all arranged in accordance with at least some implementations of the present disclosure.

As described above, system 1900 may be embodied in varying physical styles or form factors such as motor vehicle platform form factors or computing platform form factors. FIG. 20 illustrates an example small form factor device 2000, arranged in accordance with at least some implementations of the present disclosure. In some examples, system 1900 may be implemented via device 2000. In other examples, system 100 or portions thereof may be implemented via device 2000. In various embodiments, for example, device 2000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 20, device 2000 may include a housing with a front 2001 and a back 2002. Device 2000 includes a display 2004, an input/output (I/O) device 2006, and an integrated antenna 2008. Device 2000 also may include navigation features 2012. I/O device 2006 may include any suitable I/O device for entering information into a mobile computing device. Examples for I/O device 2006 may include an alphanumeric keyboard, a numeric keypad, a touch pad, input keys, buttons, switches, microphones, speakers, voice recognition device and software, and so forth. Information also may be entered into device 2000 by way of microphone (not shown), or may be digitized by a voice recognition device. As shown, device 2000 may include a camera 2005 (e.g., including a lens, an aperture, and an imaging sensor) and a flash 2010 integrated into back 2002 (or elsewhere) of device 2000. In other examples, camera 2005 and flash 2010 may be integrated into front 2001 of device 2000 or both front and back cameras may be provided. Camera 2005 and flash 2010 may be components of a camera module to originate image data processed into streaming video that is output to display 2004 and/or communicated remotely from device 2000 via antenna 2008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
a memory to store a current frame of video; and
a processor coupled to the memory, the processor to:
    downsample the current frame of video to generate a downsampled current frame and store the downsampled current frame to the memory;
    receive, during said downsample, a portion of the downsampled current frame from the memory and perform, during said downsample, motion estimation for a plurality of blocks of the portion using only the portion to provide a plurality of motion vectors for the plurality of blocks;
    replace at least one of the plurality of motion vectors based on confidence scores corresponding to the plurality of motion vectors to generate a motion vector field;
    blend the current frame and a previous frame of the video based on the motion vector field to generate a temporally filtered current frame; and
    one of transmit the temporally filtered current frame for display or encode the temporally filtered current frame to generate a bitstream.

2. The system of claim 1, further comprising:
a display to present the temporally filtered current frame to a user; and
an image sensor to capture a subsequent frame of the video, wherein said presentment of the temporally filtered current frame is prior to said capture of the subsequent frame of the video.

3. The system of claim 1, wherein the motion estimation comprises one of block matching or cross correlation using only the portion of the downsampled current frame.

4. The system of claim 1, wherein the processor to replace the at least one of the plurality of motion vectors comprises the processor to replace the at least one of the plurality of motion vectors for a first block with one of a motion vector for a second block spatially neighboring the first block or a motion vector for a third block of the previous frame that is collocated with the first block.

5. The system of claim 1, the processor to generate a first confidence score of the confidence scores for a first block of the current frame by the processor to:
    evaluate a first cost function value for a first motion vector of the plurality of motion vectors, wherein the first motion vector is a selected motion vector for the first block based on the motion estimation and the first motion vector references a first reference block of a downsampled previous frame, and a plurality of neighboring cost function values each corresponding to the first block relative to spatial neighbors of the first reference block to determine the first confidence score.

6. The system of claim 5, wherein the processor to evaluate the first cost function value and the plurality of neighboring cost function values comprises the processor to:
determine a plurality of relative cost function values, one for each of the plurality neighboring cost function values, using the neighboring cost function value and the first cost function value;
map the plurality of relative cost function values to a plurality of confidence scores using a mapping function; and
combine the plurality of confidence scores to generate the first confidence score.

7. The system of claim 6, wherein a relative cost function value of the plurality of relative cost function values comprises a difference between a neighboring cost function value and the first cost function value normalized using the first cost function value and the processor to combine the plurality of confidence scores comprises the processor to determine a sum of reciprocals of the plurality of confidence scores.

8. The system of claim 1, wherein the processor to perform motion estimation for a first block of the plurality of blocks comprises the processor to:
determine a plurality of cost function values each for a reference block of a downsampled previous frame relative to the first block, wherein a first cost function value of the plurality of cost function values comprises a block similarity component, a temporal regularization component, and a spatial regularization component.

9. The system of claim 8, wherein the temporal regularization component comprises a difference between a candidate motion vector and a motion vector for a first reference block in the downsampled previous frame collocated with the first block, and the processor is to:
fit a linear parametric motion model to a motion vector field for the previous downsampled frame; and
determine the motion vector for the first reference block in the downsampled previous frame using the linear parametric motion model.

10. The system of claim 1, the processor further to, prior to said blend:
refine the motion vector field to generate a refined motion vector field, wherein the processor to blend comprises the processor to use the refined motion vector field and the processor to refine the motion vector field comprises the processor to:
scan a window through the downsampled current frame, a second downsampled current frame, or the current frame; and
iteratively optimize, at each scan window location, a global cost function using the motion vector field within only the current window using an intra-window scan, wherein the global cost function is a cost function for the entire current frame.

11. The system of claim 1, the processor to:
verify alignment between the current frame and the previous frame; and
when at least a region of the current frame and the previous frame are misaligned, perform spatial filtering for a target pixel in the region of the current frame, wherein the processor to spatial filtering comprises the processor to:
apply a separable horizontal and vertical finite impulse response filters to the target pixel;
determine weights for a vertical infinite response filter using a previous row of pixels relative to the target pixel;
apply the vertical infinite response filter to the target pixel; and
blend the separable horizontal and vertical finite impulse response filtered pixel and the vertical infinite response filtered pixel to generate a resultant pixel.

12. A computer-implemented method for temporal noise reduction in video comprising:
downsampling a current frame of video to generate a downsampled current frame;
receiving, during said downsampling, a portion of the downsampled current frame and performing, during said downsampling, motion estimation for a plurality of blocks of the portion using only the portion to provide a plurality of motion vectors for the plurality of blocks;
replacing at least one of the plurality of motion vectors based on confidence scores corresponding to the plurality of motion vectors to generate a motion vector field;
blending the current frame and a previous frame of the video based on the motion vector field to generate a temporally filtered current frame; and
displaying the temporally filtered current frame to a user or encoding the temporally filtered current frame to generate a bitstream.

13. The method of claim 12, wherein said displaying is prior to capture of a subsequent frame of the video.

14. The method of claim 12, further comprising generating a first confidence score of the confidence scores for a first block of the current frame by:
evaluating a first cost function value for a first motion vector of the plurality of motion vectors, wherein the first motion vector is a selected motion vector for the first block based on the motion estimation and the first motion vector references a first reference block of a downsampled previous frame, and a plurality of neighboring cost function values each corresponding to the first block relative to spatial neighbors of the first reference block to determine the first confidence score.

15. The method of claim 14, wherein evaluating the first cost function value and the plurality of neighboring cost function values comprises:
determining a plurality of relative cost function values, one for each of the plurality neighboring cost function values, using the neighboring cost function value and the first cost function value;
mapping the plurality of relative cost function values to a plurality of confidence scores using a mapping function; and
combining the plurality of confidence scores to generate the first confidence score.

16. The method of claim 12, wherein performing said motion estimation for a first block of the plurality of blocks comprises:
determining a plurality of cost function values each for a reference block of a downsampled previous frame relative to the first block, wherein a first cost function value of the plurality of cost function values comprises a block similarity component, a temporal regularization component, and a spatial regularization component.

17. The method of claim 12, further comprising, prior to said blending:

refining the motion vector field to generate a refined motion vector field, wherein said blending uses the refined motion vector field and said refining comprises:
   scanning a window through the downsampled current frame, a second downsampled current frame, or the current frame; and
   iteratively optimizing, at each scan window location, a cost function based on the motion vector field within only the current window using an intra-window scan.

18. At least one non-transitory machine readable medium comprising a plurality of instructions that, in response to being executed on a computing device, cause the computing device to:
   downsample a current frame of video to generate a downsampled current frame;
   receive, during the downsample, a portion of the downsampled current frame and perform, during said downsample, motion estimation for a plurality of blocks of the portion using only the portion to provide a plurality of motion vectors for the plurality of blocks;
   replace at least one of the plurality of motion vectors based on confidence scores corresponding to the plurality of motion vectors to generate a motion vector field;
   blend the current frame and a previous frame of the video based on the motion vector field to generate a temporally filtered current frame; and
   display the temporally filtered current frame to a user or encoding the temporally filtered current frame to generate a bitstream.

19. The non-transitory machine readable medium of claim 18, wherein the display of the temporally filtered current frame is prior to capture of a subsequent frame of the video.

20. The non-transitory machine readable medium of claim 18, further comprising a plurality of instructions that, in response to being executed on the computing device, cause the computing device to:
   evaluate a first cost function value for a first motion vector of the plurality of motion vectors, wherein the first motion vector is a selected motion vector for the first block based on the motion estimation and the first motion vector references a first reference block of a downsampled previous frame, and a plurality of neighboring cost function values each corresponding to the first block relative to spatial neighbors of the first reference block to determine the first confidence score.

21. The non-transitory machine readable medium of claim 20, wherein the computing device to evaluate the first cost function value and the plurality of neighboring cost function values comprises the computing device to:
   determine a plurality of relative cost function values, one for each of the plurality neighboring cost function values, using the neighboring cost function value and the first cost function value;
   map the plurality of relative cost function values to a plurality of confidence scores using a mapping function; and
   combine the plurality of confidence scores to generate the first confidence score.

22. The non-transitory machine readable medium of claim 18, wherein the computing device to perform said motion estimation for a first block of the plurality of blocks comprises the computing device to:
   determine a plurality of cost function values each for a reference block of a downsampled previous frame relative to the first block, wherein a first cost function value of the plurality of cost function values comprises a block similarity component, a temporal regularization component, and a spatial regularization component.

23. The non-transitory machine readable medium of claim 18, further comprising a plurality of instructions that, in response to being executed on the computing device, cause the computing device to, prior to said blend:
   refine the motion vector field to generate a refined motion vector field, wherein said blend uses the refined motion vector field and to refine the motion vector field comprises:
      scanning a window through the downsampled current frame, a second downsampled current frame, or the current frame; and
      iteratively optimizing, at each scan window location, a cost function based on the motion vector field within only the current window using an intra-window scan.

* * * * *